(12) United States Patent
Muto et al.

(10) Patent No.: US 8,224,470 B2
(45) Date of Patent: Jul. 17, 2012

(54) SOUND SYSTEM, AND CONTROLLING AND MONITORING METHOD THEREFOR

(75) Inventors: Takaaki Muto, Hamamatsu (JP); Hiromu Miyamoto, Hamamatsu (JP); Akio Suyama, Hamamatsu (JP); Hiroshi Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 669 days.

(21) Appl. No.: 12/401,563

(22) Filed: Mar. 10, 2009

(65) Prior Publication Data

US 2009/0234478 A1 Sep. 17, 2009

(30) Foreign Application Priority Data

| Mar. 11, 2008 | (JP) | 2008-061479 |
| Mar. 11, 2008 | (JP) | 2008-061480 |
| Mar. 11, 2008 | (JP) | 2008-061481 |

(51) Int. Cl.
 *G06F 17/00* (2006.01)
(52) U.S. Cl. ........................................ 700/94
(58) Field of Classification Search ............. 700/94; 381/119; 369/4; 704/500–504
See application file for complete search history.

(56) References Cited

U.S. PATENT DOCUMENTS

| 2001/0051930 A1 | 12/2001 | Nakamura |
| 2002/0161865 A1* | 10/2002 | Nguyen ...................... 709/220 |
| 2005/0108342 A1 | 5/2005 | Sasaki et al. |

FOREIGN PATENT DOCUMENTS

| JP | 2001-312474 A | 11/2001 |
| JP | 2005-115865 A | 4/2005 |

OTHER PUBLICATIONS

Yamaha Corporation. (2003). NetworkAmp Manager: Owner's Manual, English language document, 43 pages.
Yamaha Corporation. (2003). NetworkAmp Manager: Owner's Manual, Japanese language document, 43 pages.
Notice of Grounds for Rejection (Office Action) mailed Dec. 20, 2011, for JP Patent Application No. 2008-061479, with English Translation, six pages.

* cited by examiner

*Primary Examiner* — Andrew C Flanders
(74) *Attorney, Agent, or Firm* — Morrison & Foerster LLP

(57) ABSTRACT

A plurality of amplifiers and PCs each having installed therein remote controlling software for controlling the amplifiers are connected to a network. Data stored in a memory of each of the amplifiers include a device ID, operation data and an area ID. Memory of each of the PCs stores therein a project file each including area IDs, device information and device IDs. On the basis of the area IDs and device IDs stored in the amplifiers and the area IDs and device IDs stored in the project file, a CPU of the PC performs association between the amplifiers and virtual devices indicated by the device information and overwrites the operation data of a particular amplifier, having been associated with any one of the virtual devices, onto the project file, to thereby display, on a display, the operation data of the associated amplifier as operation data of the corresponding virtual device.

20 Claims, 14 Drawing Sheets

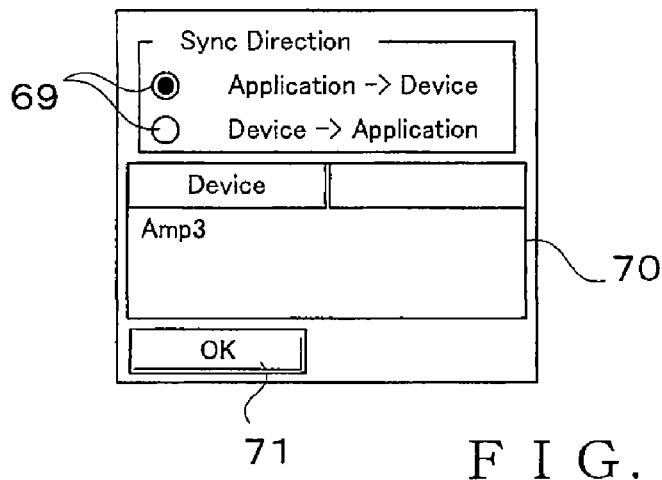
F I G. 1 9
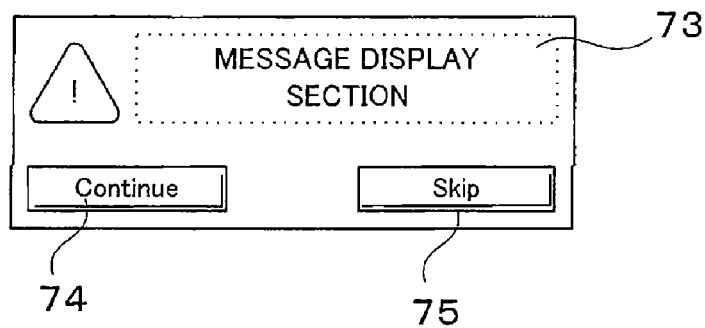
F I G. 2 0
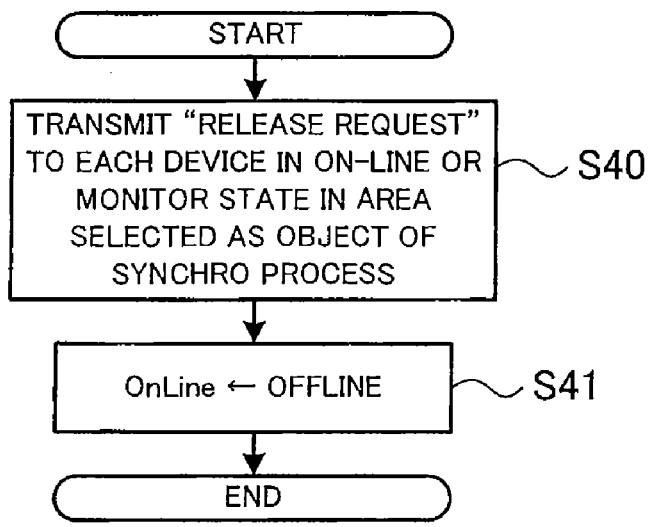
F I G. 2 1

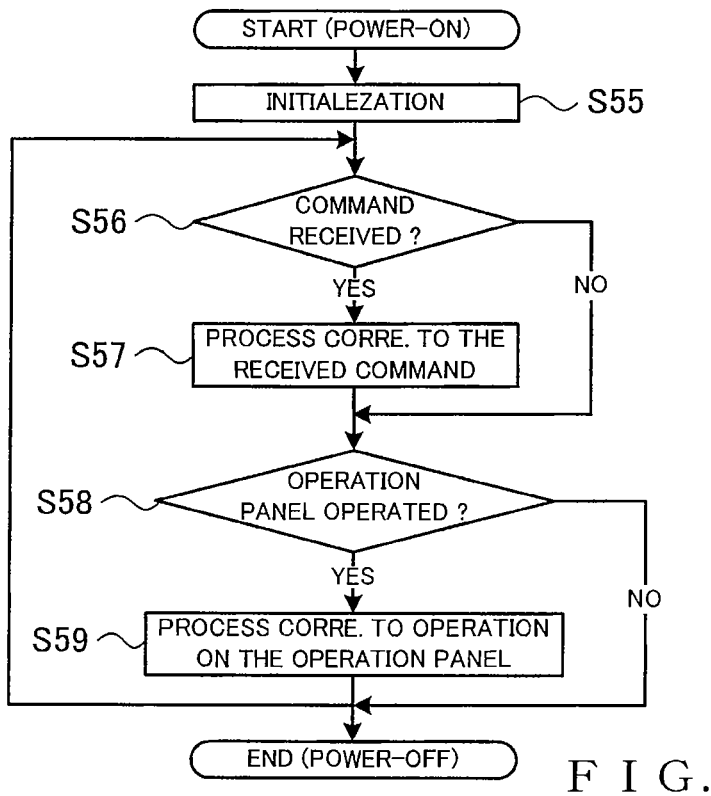
F I G. 2 4
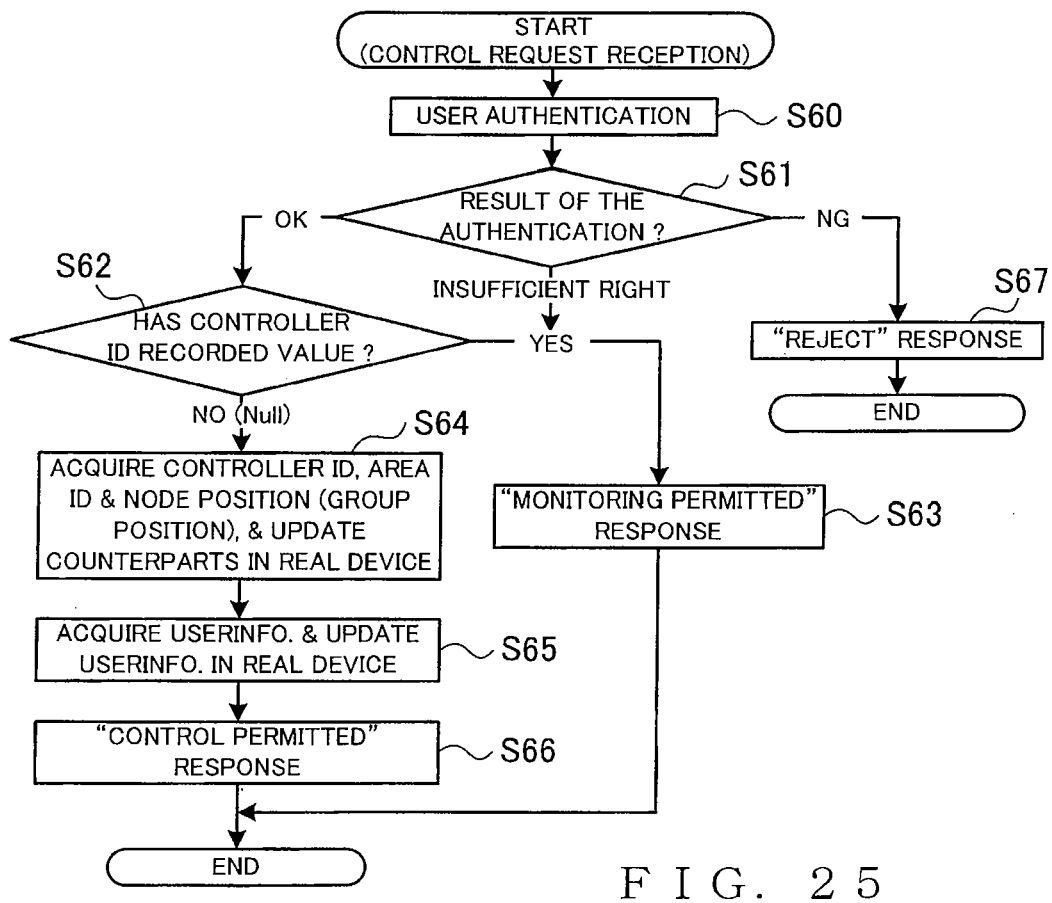
F I G. 2 5

SOUND SYSTEM, AND CONTROLLING AND MONITORING METHOD THEREFOR

BACKGROUND

The present invention relates to a sound system including a network having connected thereto a plurality of audio devices and at least one control device for controlling the audio devices, and more particularly to a technique for controlling and monitoring the audio devices via the control device.

Basically, sound systems, commonly called PA (acronym for Public Address) systems or SR (acronym for Sound Reinforcement) systems, are arranged to send sound signals, supplied from a sound signal supply source such as an audio mixing apparatus (mixer), to power amplifier devices so that speakers are driven by the sound signals having been power-amplified by the power amplifier devices. For example, large-scale sound systems are installed in large-area buildings etc., such as music performance venues, theaters and various types of halls. Because a plurality of power amplifier devices are provided in a large-scale sound system, control and management of the plurality of power amplifier devices tend to be complicated.

Among the conventionally-known types of power amplifier devices are ones of a type that is connected to a network of the Ethernet (registered trademark) standard and can be remote-controlled from a control device connected thereto via the network. The control device comprises, for example, a personal computer (PC) provided with a dedicated application program (i.e., remote controlling software) for remote-controlling the power amplifier devices. Various data to be used by the PC for performing the remote control are stored in a memory of the PC as a project file. The remote controlling software is arranged to open a project file upon start-up of the remote controlling software, and remote-controls a power amplifier device on the basis of the various data contained in the project file. By execution of such remote controlling software, a user can remote-control one or more power amplifier devices on the network or monitor operating states of the one or more power amplifier devices, using the single PC (see, for example, Instruction Manual of "NetworkAmp Manager" available from http://www2.yamaha.co.jp/manual/pdf/pa/japan/amp/acu16c_ja_om.pdf).

According to the conventionally-known technique, in a case where a plurality of PCs are connected to a network and remote controlling software is activated in each of the PCs so that each of the PCs can control or monitor power amplifier devices on the network, what can control or monitor a given one of the power amplifier devices is only one of the PCs which has first set the power amplifier device in an on-line state (i.e., controlled or monitored state); namely, the given power amplifier device can never be controlled or monitored via the remote controlling software of any of the other PCs.

Thus, it has so far been demanded that, while the remote controlling software of a given one of the PCs is controlling any one of the power amplifier devices, data of parameter settings, operating states, etc. of the controlled power amplifier device be monitored via the remote controlling software of another one of the PCs. However, in meeting such a demand, it is never desirable that the other PC be allowed to monitor all of the power amplifier devices without limitation. More specifically, it is desirable that only a power amplifier device registered, as an object of control or monitoring, in a project file currently opened in each of the controlling and monitoring PCs be monitored by that PC, namely, it is desirable that the monitoring PC be inhibited from monitoring a power amplifier device newly added to the project file of the controlling PC, a power amplifier device deleted from the project file of the controlling PC, etc. In other words, it is desirable to limit a range of power amplifier devices that can be monitored by another PC than the controlling PC (i.e., control-master PC).

Further, in a case where a plurality of power amplifier devices are to be controlled, it would be convenient if the power amplifier devices can be managed in several groups, i.e. on a group-by-group basis, by the remote controlling software (PC). If the plurality of power amplifier devices are managed divided in groups like this, it is desirable that a PC controlling the power amplifier devices be allowed to confirm a state of grouping of the amplifier devices as well. However, in such a case too, it is desirable to limit a range of the power amplifier devices that can be monitored by another PC.

Further, the conventionally-known technique would present the problem that, each time a power amplifier device is newly connected to the network, a user has to manually perform association, on an operating screen or the like of a project file, between data of the project file and the actual or real power amplifier devices to be controlled or monitored and such associating operation tends to be very cumbersome. Particularly, in a large-scale sound system, the number of audio devices, such as power amplifier devices, to be connected to a network, tends to be enormous, and thus, such associating operation tends to be extremely cumbersome.

SUMMARY OF THE INVENTION

In view of the foregoing, it is an object of the present invention to provide an improved sound system which includes a network having connected thereto a plurality of audio devices and at least one control device for controlling the audio device and in which only a particular group of audio devices can be selectively monitored via the control device, as well as a controlling/monitoring method for use in the sound system.

It is another object of the present invention to provide an improved sound system and controlling/monitoring method therefor which permit automatic association between individual virtual devices (pieces of virtual device information) of a project file and real devices (audio devices).

In order to accomplish the above-mentioned objects, the present invention provides an improved sound system including a network having connected thereto a plurality of audio devices and at least one control device for controlling the plurality of audio devices, in which each of the plurality of audio devices includes a first storage section storing therein an audio device ID identifying the audio device, control data for controlling the audio device, and an area ID indicative of an area the audio device belongs to, the audio device ID being composed of an unique ID and an in-area ID, the in-area ID and area ID being set by a user. Further, in the sound system, the control device comprises: a second storage section storing therein one piece of area information including an area ID indicative of an area and one or more pieces of virtual device information for one or more virtual devices registered in the area, each of the virtual device information including a virtual device ID identifying the corresponding virtual device, and control data for remotely controlling an audio device related to the corresponding virtual device; a matching section that receives, from each of the audio devices connected via the network, the audio device ID and the area ID in the first storage section of the audio device and judges, for each of the audio devices, if the audio device ID and the area ID from the audio device match any of the virtual device IDs and the area ID in the second storage section or not and, if the judgment is affirmative, relates the audio device with the virtual device identified by the matched virtual device ID and the area ID; a synchronization section that synchronize the control data for the virtual devices with the control data in the audio devices, by receiving, for each of the virtual devices, the control data from the audio device related with the virtual device and overwriting the control data for the virtual device in the second storage section with the received control data, or by transmitting, for each of the virtual device, the control data for the virtual device in the second storage section to the audio device related with the virtual device to overwrite the control data in the audio device with the transmitted control data; and a remote control section that remotely controls each of the audio device if the control data in the audio device is synchronized with the control data for one virtual device in the second storage section at the moment, by displaying the control data for the virtual device in the second storage section for the user, receiving a control operation by the user, and modifying the control data for the virtual device in the second storage section and the control data in the audio device at once in response to the control operation.

According to the present invention, the audio device ID comprises the unique ID that can not be changed by the user and the in-area ID that can be changed by the user, and similarly, the virtual device ID comprises an unique ID, and an in-area ID that can be changed by the user. If either the unique ID or the in-area ID matches any of the virtual device IDs and the area ID in the second storage section, then it is determined to be a match. Thus, for each area identified by the area ID, automatic matching can be performed flexibly between the virtual devices and the audio devices.

Because the first storage section of each of the audio devices stores therein an audio device ID identifying the audio device, control data for controlling the audio device and the area ID, each of the audio devices can supply its audio device ID and area ID to the control device via the network. Further, the second storage section stores therein one piece of area information including the area ID, one or more pieces of virtual device information including control data for remotely controlling the audio devices and the virtual device ID identifying the corresponding virtual device. Thus, by reading the area information and virtual device information from the second storage section and receiving the area information ID and the audio device ID from each of the audio devices, the control device can perform association (matching) between the audio devices and the virtual devices on the basis of the audio device IDs and area ID of the audio devices and the area ID and virtual device IDs included in the area information and virtual device information. In the association (matching) process, association can be made between any one of the audio devices and any one of virtual devices only when the audio device and the virtual devices match each other in audio device ID, virtual device ID and area IDs. For example, even if the audio device and the virtual device match each other in audio device ID and virtual device ID alone, no association can be achieved between the audio device and the virtual device if they do not match each other in area IDs, in which case, the audio device can not be remotely controlled by the control device. In an alternative, even when there is no match in the area ID, association can be achieved between the audio device and the virtual device as along as the unique ID in the audio device ID and the unique ID in the virtual device ID match each other, in which case, the audio device can be remotely controlled by the control device. Further, any audio device corresponding to a virtual device not registered in any of the areas in the control device can not be remotely controlled even if it is connected to the network. Further, the control data of the audio device having been successfully associated with any one of the virtual devices can be remotely controlled and/or monitored by the control device receiving the control data from the associated audio device and displaying the received control data on the display section as control data of the virtual device with which the audio device has been associated (i.e., the virtual device corresponding to the associated audio device).

Preferably, each of the virtual devices and the audio devices in the area belongs to one of a plurality of groups created in the area, the area information in the second storage section of the control device further includes group information indicative of the groups to which the virtual devices belongs. Further, the first storage section of each of the plurality of audio devices further stores therein group information indicative of one of the groups to which the audio device belongs, the synchronization section further synchronizes the group information in the audio devices with the group information for the virtual devices in the second storage section, and the control device further comprises a group display section that displays icons of the virtual devices grouped into the groups in accordance with the group information in the second storage section.

In a case where the control device should manage the plurality of audio devices in several divided groups, group information is stored both in the first storage section of each of the audio devices and in the area information in the second storage section of the control device. The group display section displays icons of the virtual devices grouped into the groups in accordance with the group information in the second storage section. In this case, even when the audio device has been moved from one group to another within the same area, the control data of the audio device can be displayed as control data of a virtual device belonging to the other (i.e., moved-to) group.

Preferably, the matching section further receives the group information stored in the first storage section from each of the audio devices and judges, for each of the audio devices, if the audio device ID, the area ID, and the group information from the audio device matches any of the virtual device IDs and the group information corresponding to the virtual device IDs, and the area ID in the second storage section or not and, if the judgment is affirmative, relates the audio device with the virtual device identified by the matched virtual device ID and the area ID. Thus, also in a case where any one of the audio devices and any one of the virtual devices do not match each other in group information, association can not be achieved between the audio device and the virtual device. Namely, in the case where the audio device and the virtual device do not match each other in group information, the audio device can not be remotely controlled and/or monitored by the control device.

Preferably, at least one of the audio devices may further include a first setting section that sets s the in-area ID in the audio device ID and the area ID, for storage in the first storage section, in response to a first setting operation by the user. The control device may comprise a registration section that newly registers a virtual device in the area in response to a registering operation by the user, one piece of virtual device information for the registered virtual device being stored in the second storage section. The control device may further comprise a second setting section that sets at least one of the virtual device IDs, for storage in the second storage section, in response to a second setting operation by the user.

By the provision of the first setting section in the audio device, an audio device ID for identifying the audio device can be set in advance into the audio device. Further, when virtual device information has been registered by the registration section, the second setting section provided in the control device can set the registered virtual device information into the audio device.

Further, preferably, in the sound system of the present invention, the control device further comprises an automatic setting section that, when the virtual device is newly registered in the area, automatically sets the virtual device ID for the virtual device, for storage in the second storage section, in accordance with a predetermined rule.

Further, preferably, in the sound system of the present invention, the automatic assignment section that automatically assigns, as the virtual ID identifying the virtual device information, one of serial numbers running in order of registration, by the registration section, of virtual device information. Because one of serial numbers running in order of registration, by the registration section, of virtual device information is automatically assigned by the automatic assignment section as the virtual ID identifying the virtual device information, the user can know in advance virtual device IDs to be assigned to individual pieces of virtual device information, if the order in which the pieces of virtual device information are to be registered is determined in advance.

In a case where an audio device corresponding to virtual device information registered in any one of the areas of the project file is connected to the network and where the area information of the audio device matches the area information of the area having the virtual device information registered therein, the present invention can achieve the advantageous benefit that the control data of the audio device can be remotely controlled (and/or monitored) by the control device. Thus, even while the audio device is being controlled by the control device, the present invention allows the control data of the audio device to be monitored by another control device than the control device (or control-master device) controlling the audio device. For example, in a case where it is desired that an audio device being currently controlled by a given control device be monitored by another control device, the audio device can not be monitored by the other control device if the audio device is a device whose virtual device information has been newly added to an area of the given control device, or a device deleted from an area by the given control device (i.e., area information of the device is not included in the other control device), or a device having been moved to another area by the given control device (i.e., area information of the device does not match of the area information of the other control device).

In a case where the control device should manage a plurality of audio devices in several divided groups, the grouping state of the plurality of audio devices can also be remotely controlled (and/or monitored) by the control device because it is displayed on the display section as virtual device information belonging to groups indicated by the group information received from the audio device and as control data of the virtual device information. In such a case, the control data of a desired one of the audio devices can be remotely controlled (and/or monitored) by the control device, only if the audio device belongs to an area indicated by the area information of the project file (i.e, the area information of the audio device and the area information in the control device match each other), similarly to the aforementioned. Further, association between the audio devices and a plurality of virtual devices is performed without using the group information, and thus, even when the audio devices has been moved from one group to another within the same area, the control data of the audio device can be displayed as control data of a virtual device belonging to the other (or moved-to) group. As a modification, association between the audio devices and the virtual device information may be performed using the group information. In such a case, arrangements made be made such that only an audio device matching any one of the pieces of virtual device information in group information as well can be remotely controlled (and/or monitored) by the control device, and that each audio device that does not match any one of the pieces of virtual device information at least in group information can not be remotely controlled (and/or monitored) by the control device.

According to another aspect of the present invention, automatic association can be performed between the audio devices and the plurality of pieces of virtual device information on the basis of the audio device IDs set in the audio devices and the virtual device IDs set in the pieces of virtual device information. Thus, by determining in advance audio device IDs (serial numbers) to be input to the individual audio devices and by the control device registering a plurality of pieces of virtual device information, which are to be associated with the audio devices, in predetermined order conforming to the serial numbers of the audio device IDs that are to be input to the individual audio devices, virtual device IDs corresponding to the audio device IDs to be input to the individual audio devices can be automatically assigned to the respective pieces of virtual device information. Then, by inputting the to-be-assigned virtual device IDs to the audio devices, one by one, and connecting the audio devices to the network, automatic association can be performed between the audio devices and the pieces of virtual device information on the basis of the pre-set audio device IDs and virtual device IDs. Thus, in a case where a formerly-created project file (i.e., data file having pieces of virtual device information registered therein) is to be used in a sound system including a plurality of audio devices corresponding to the pieces of virtual device information included in the project file, automatic association can be performed between the audio devices and the pieces of virtual device information by just the audio devices being connected to the control device via the network, similarly to the aforementioned. Further, in a case where a particular audio device so far associated with a given piece of virtual device information is disconnected from the network due to some reason (e.g., failure of the audio device) so as to be replaced with another audio device, the other audio device can be automatically associated with the given piece of virtual device information so far associated with the particular or disconnected audio device by just the audio device ID so far set in the disconnected audio device being input to the other audio device and then the other audio device being connected to the network. Namely, according to the present invention, which permits automatic association between an audio devices and virtual device information, even association between a plurality of audio devices and a plurality of pieces of virtual device information can be performed with ease and without involving cumbersome operation.

According to still another aspect of the present invention, there is provided an improved sound system including a network having connected thereto an audio device and a control device for controlling the audio device, in which the control device comprises: a first storage section having one or more pieces of account information stored therein in correspondence with one or more users for identifying individual ones of the one or more users; a first authentication section that permits any one of the users, corresponding to the one or more pieces of account information stored in the first storage section, to log in to the control device; a control request section that transmits, to the audio device, the account information corresponding to the user, having logged in to the control device through permission by the first authentication section, and a control request asking for a permission to control the audio device by means of the control device; and a state setting section that receives, from the audio device, a response to the control request and, if the control request has been accepted via the response received, sets the control device in a state capable of controlling the audio device, and in which the audio device comprises: a second storage section having one or more pieces of account information stored therein in correspondence with one or more users for identifying individual ones of the one or more users; a second authentication section that determines, on the basis of the control request and account information transmitted from the control request section of the control device, whether or not to authenticate the control request made by the logging-in user, wherein the second authentication section accepts the control request made by the logging-in user if the account information corresponding to the logging-in user matches any one of the pieces of account information stored in the second storage section, but rejects the control request made by the logging-in user if the account information corresponding to the logging-in user matches none of the pieces of account information stored in the second storage section; and a response section that returns, to the control section, a result of authentication determination by the second authentication section.

Because the audio device in the present invention determines, on the basis of (or using) the account information stored in the second storage section of the audio device, whether or not to permit control by the control device, each user having no account information in the second storage section of the audio device is not permitted to control the audio device via its control device (i.e., the user can not set the audio device in an on-line state via the control device). Thus, the present invention can effectively prevent the audio device from being controlled or monitored by any unauthorized user, to thereby protect the audio device. Further, by overwriting, onto the second storage section of the audio device, the account information stored in the first storage section of the control device having been permitted to control the audio device, the second storage section of the audio device can be placed in a state having stored therein the same account information as stored in the first storage section of the control device having been permitted to control the audio device. In this way, it is possible to prevent any user, having no account information in the first storage section of the control device currently controlling the audio device, from controlling or monitoring the audio device (i.e., from setting the audio device in the on-line state). Thus, after an account of a given user is deleted from a given file to thereby create a new project file (with the user's account deleted therefrom), the control device can not control or monitor the audio device using the previous (deleted) account if the control device is currently controlling the audio device using the new project file.

According to still another aspect of the present invention, there is provided an improved sound system including a network having connected thereto a plurality of audio devices and at least one control device for controlling the plurality of audio devices, in which the control device comprises: a display device; a first storage section having stored therein, in correspondence with the plurality of audio devices, a plurality of pieces of virtual device information including control data for controlling the audio devices and group information indicative of groups the plurality of pieces of virtual device information belong to; and a display control section that performs control for, on the basis of the group information stored in the first storage section, displaying, on the display device, the plurality of pieces of virtual device information separately for each of the groups the pieces of virtual device information belong to, each of the plurality of audio devices including a second storage section having stored therein an audio device ID identifying the audio device, group information indicative of a group a corresponding one of the pieces of virtual device information belongs to, and control data for controlling behavior of the audio device, and in which the control device further comprises: an association section that receives, from each of the plurality of audio devices, the audio device ID stored in the second storage section and thereby performs association between the pieces of virtual device information and the audio devices on the basis of the received audio device IDs and virtual device IDs stored in the first storage section; a first synchronization control section that, when a particular one of the audio devices having been associated with any one of the pieces of virtual device information is to be set as an object of remote control, writes the group information of the piece of virtual device information, stored in the first storage section in correspondence with the particular audio device, into the second storage section of the particular audio device corresponding to the one piece of virtual device information; a remote control section that, for the particular audio device set as the object of remote control by the first synchronization control section, changes the control data of the one piece of virtual device information stored in the first storage section and thereby changes, through remote control, the corresponding control data stored in the second storage section; a second synchronization control section that, when a particular one of the audio devices having been associated with one of the pieces of virtual device information is to be set as an object of monitoring, receives the group information stored in the second storage section of the particular audio device to be set as the object of monitoring and updates the corresponding group information, stored in the first storage section, on the basis of the received group information, to thereby perform control to cause the display control section to update a grouping state, on the display device, of the pieces of virtual device information; and a monitoring control section that, when the control data stored in the second storage section has been changed in the particular audio device having been set as the object of monitoring by the second synchronization control section, changes the control data of the virtual device information, stored in the first storage section in correspondence with the audio device set as the object of monitoring, similarly to the changed control data in the second storage section.

With the present invention arranged in the aforementioned manner, an audio device having been successfully associated with any one of the pieces of virtual device information can be monitored by another control device than the control device remote-controlling the audio device. Further, according to the present invention, a grouping state of a plurality of pieces of virtual device information in the control device monitoring the audio device can be set to agree with the grouping state of the corresponding pieces of virtual device information in the control device controlling the audio device. As a consequence, the present invention can advantageously allow the monitoring control device to check and confirm not only the control data but also the grouping state of the to-be-monitored audio device. Further, the control device remote-controlling the audio device can simultaneously remote-control any other audio devices belonging to the same group as above-mentioned audio device. Although each of the audio devices has group information, such group information is used to allow a control device to monitor the audio device; no complicated processing is required for collectively remote-controlling the audio devices on a group-by-group basis.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIGS. 8A-8C are diagrams showing an example construction of a tree display section on the basic screen of FIG. 7, of which FIG. 8A shows a device tree, FIG. 8B shows a rack tree and FIG. 8C shows a feed structure group tree;

FIGS. 9A and 9B are diagrams showing example detailed structures of a level display section, state display section and attenuator operation section on the basic screen of FIG. 7, of which FIG. 9A shows an example screen display presented when an amplifier has been selected and FIG. 9B shows another example screen display presented when an area or group has been selected;

FIG. 19 is a diagram showing a structure of a "Synchronizing Direction Selection" screen displayed for a user to select a synchronizing direction in a synchronizing process of FIG. 18;

FIG. 20 is a diagram showing a structure of a "Warning Dialogue" screen displayed when an error has occurred during the synchronizing process of FIG. 18;

FIG. 21 is a flow chart showing an example operational sequence of a process performed by the personal computer in response to operation of the "Go On-line" instruction button image on the "Synchronized Dialog" screen;

FIG. 24 is a flow chart outlining an amplifier-control-related operational sequence performed by the amplifier;

FIG. 25 is a flow chart showing an example operational sequence of a process performed by the amplifier when a control request has been received from the personal computer;

DETAILED DESCRIPTION

Preferred embodiments of the present invention will now be described in relation to a case where the basic principles of the invention are applied to a sound system of the invention having power amplifier devices and personal computers for remote-controlling the power amplifier devices. Let it be assumed here that the sound system is of a type commonly called PA or SR system and suited for installation in large-area buildings etc., such as music performance venues, theaters and various types of halls.

Figure 1:
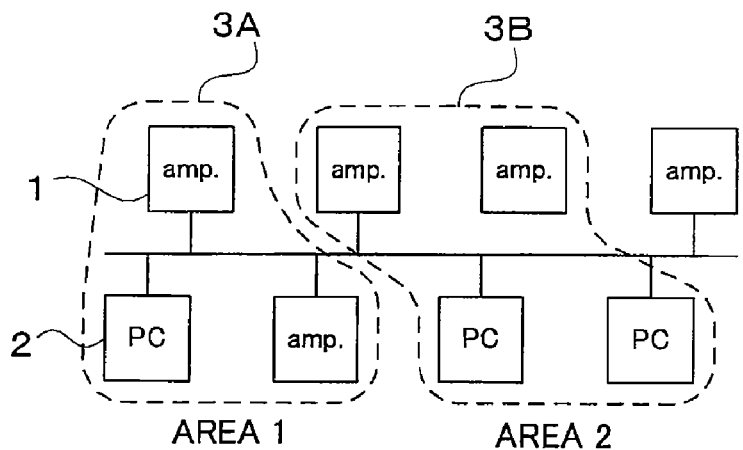
FIG. 1 is a block diagram showing an example general setup of a power amplifier network constituting an embodiment of a sound system of the present invention.

FIG. 1 is a block diagram showing an example module setup of the embodiment of the sound system of the present invention. The sound system shown in FIG. 1 includes a plurality of power amplifier devices (hereinafter sometimes referred to simply as "amplifiers") 1, and a plurality of personal computers (PCs) 2. The plurality of amplifiers 1 and the plurality of PCs 2 are physically interconnected via a general-purpose network cable, such as an Ethernet (registered trademark) cable, to constitute a local area network (LAN). Ordinary data communication based on the TCP/IP protocol is permitted between the power amplifier devices and the PCs 2 on the network. In addition, audio signals may be communicated between the devices and the PCs, through real time transfer using the same network. For that purpose, a suitable conventionally-known data transfer format, such as CobraNet (registered trademark), may be employed.

Each of the amplifiers 1 is an audio device that performs sound signal processing, including power amplification, on an externally-input sound signal and outputs the resultant processed sound signal to a speaker not shown. In the instant embodiment of the sound system of the present invention, each of the amplifiers 1 is of a type that can be connected to the network and controlled by any of the control devices (PCs) 2 connected with the amplifier 1 via the network. In the instant embodiment, a casing of each of the amplifiers 1 is preferably of a so-called rack-mount type that is mountable on a dedicated rack. A plurality of the amplifiers 1 are mountable on a single dedicated rack so that they can be conveniently transported, installed, etc. Thus, when a plurality of the amplifiers 1 of the rack-mount type are to be rented to a borrower, for example, the amplifiers 1 are often rented mounted on the rack.

Each of the PCs 2 is a general-purpose personal computer equipped with an operating system, such as "Windows (registered trademark)", and it is also equipped with a dedicated software program (hereinafter referred to as "remote controlling software") for remote-controlling the amplifiers 1 connected thereto via the network. The remote controlling software is an application program running on the operating system of the PC 2. By executing the remote controlling software, the PC 2 functions as the control device for controlling the amplifiers 1 connected thereto via the network. Namely, using the functions provided by the remote controlling software, a user operating the PC 2 can control operation of the amplifiers 1 resident on the network and monitor operating states of the amplifiers 1. In the illustrated example of FIG. 1, the remote controlling software is executed individually in each of the plurality of PCs 2 resident on the network.

As will be later described, the amplifier control by the remote controlling software is performed on an area-by-area basis. One or more amplifiers 1 can be registered in each of the areas and become objects of control in that area. In FIG. 1, each of the areas is shown as enclosed by dotted line. Two amplifiers 1 and one PC 2 are included in "area 1" depicted at 3A, and two amplifiers 1 and two PCs 2 are included in "area 2" depicted at 3B. Further, on the network 1, there are one or more amplifiers 1 that are not registered in any area. Even when the remote controlling software of any one of the PCs 2 recognizes (detects) presence of such an amplifier 1 that is not registered in any area, that amplifier 1 can not be controlled by the remote controlling software.

Note that, although the sound system shown in FIG. 1 includes other devices than the amplifiers 1 and PCs 2, such as a dedicated interface device (e.g., ACD) for connecting to the network an amplifier of a type having no network I/O, illustration and description of these other devices is omitted for convenience. Connecting the amplifier to the remote-controlling network via the dedicated interface device is a conventionally-known technique. Audio devices other than the amplifiers, such as a digital mixer, recorder, effecter, A/D converter, D/A converter and synthesizer, may be collectively connected to the network and controlled together with the amplifiers by the remote controlling software of the PCs 2.

Figure 2:
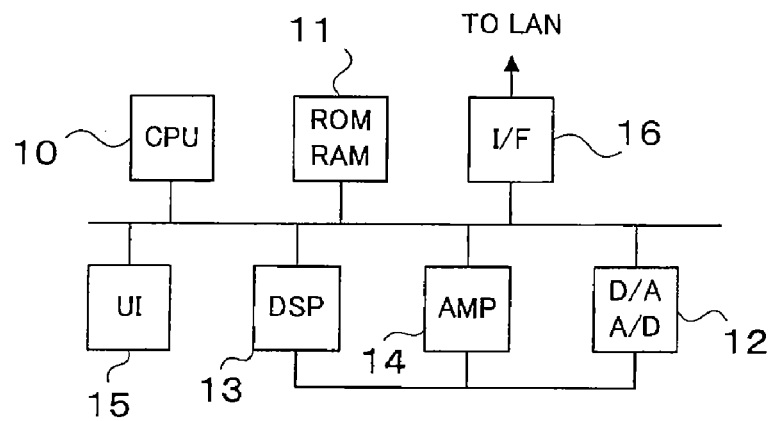
FIG. 2 is a block diagram explanatory of an example general electric hardware setup of an amplifier shown in FIG. 1.

FIG. 2 is a block diagram explanatory of a general hardware setup of each of the amplifiers 1 shown in FIG. 1; all of the amplifiers 1 are generally identical to each other in general hardware setup. The amplifier 1 comprises: a control section including a CPU 10 and a memory 11 having a ROM and RAM; an audio I/O section 12 including D/A and A/D converters; a signal processing section (DSP) 13, a power amplification section (AMP) 14; a user interface section (UI) 15 including operating members, display device, etc.; and a network communication interface (communication I/F) 16. The above-mentioned components are interconnected via a communication bus 10B. The communication I/F 16 is a network interface complying with the Ethernet (registered trademark) standard. The amplifier 1 is connected to the network via the communication I/F 16 and communicates various data with any of the PC 2 connected therewith via the network. The amplifier 1 includes, as the user interface section 15, an operation panel that has physical operating members, such as sound level adjusting knobs, operating members for setting a later-described in-area ID and area ID into the memory 11, and various displays showing operating states of the amplifier 1. In FIG. 2, illustration of connection lines between external sources and external sinks and the audio I/O section 12 and between the power amplification section 14 and external speeches is omitted.

The CPU 10 executes control programs, stored in the memory (ROM/RAM) 11, to control operation of the amplifier 1. In the memory 11, there are stored various control programs to be executed by the CPU 10, and various data, such as operation data to be used in audio signal processing performed by the amplifier 1 (i.e., processing performed by the DSP 13 and power amplification section 14).

The audio I/O 12 includes sound signal terminals of a plurality of predetermined channels. Analogue waveform signals or digital waveform data of the plurality of predetermined channels are input from an external source (not shown) to the amplifier 1 via the audio I/O 12. At that time, the analogue waveform signals are converted into digital waveform data. The externally-input sound signals of the plurality of channels are supplied to the DSP 13.

The DSP 13, which includes sound signal processing channels corresponding to the above-mentioned sound signal terminals of the plurality of predetermined channels, performs, for each of the channels, sound signal processing on digital waveform data input to the channel on the basis of an instruction given by the CPU 10. The sound signal processing performed by the DSP 13 includes any of a crossover process, delay process, equalizer process, limiter process, howling-preventing process, etc. Such sound signal processing is intended to adjust characteristics of the sound signals and protect the amplification section 14 and speakers, and sound signal processing is controlled in accordance with the operation data stored in the memory 11.

For each of the channels, an output signal from the DSP 13 is converted into an analog waveform signal via a D/A converter (not shown) provided in an input portion of the amplification section 14 and then supplied to a power amplification circuit (not shown) of the amplification section 14. The power amplification circuit power-amplifies the signal of each of the channels output from the DSP 13 and converted into the analog waveform signal. The thus-amplified analog waveform signals of the individual channels are output to external speakers (not shown) via sound signal output terminals of a plurality of predetermined channels provided in the amplification section 14, so that the speakers are driven by the thus-output analog waveform signals. Basically, the sound signal output terminals of the predetermined channels are connected to the speakers in one-to-one relation. Further, the amplification section 14 supplies the DSP 13 with data indicative of operating states (e.g., temperature at the output stage of the section 14, signal levels at the input and output of the section 14, supply voltage, output voltage, output current, load impedance, protection state, etc.) of the amplification section 14. Such data indicative of the operating states are used by the DSP 13 in the signal processing for protecting the amplification section 14 and speakers.

Whereas FIG. 2 shows an example general setup of the amplifier 1 having the DSP 13, even an amplifier 1 of a type having no audio I/O section 12 and DSP 13 (i.e., a type where the amplification section 14 directly inputs and outputs analog signals) is applicable to the sound system of the present invention as long as the amplifier 1 is connected to any of the control apparatus (PCs) 2 via the network so that it can be remote-controlled by the control device.

Figure 3:
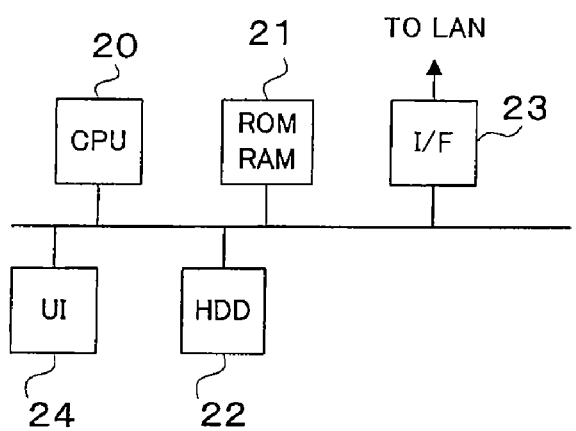
FIG. 3 is a block diagram explanatory of an example general electric hardware setup of a personal computer shown in FIG. 1.

FIG. 3 is a block diagram explanatory of an example general hardware setup of each of the PCs 2 shown in FIG. 1; note that the PCs 2 are generally identical to each other in hardware setup. The PC 2, which is a general-purpose personal computer, comprises: a CPU 20; a memory 21 having a ROM and RAM; a hard disk drive (HDD) 22; a network communication interface (communication I/F) 23; and a user interface section 24 including a display, mouse operator, keyboard, etc. The remote controlling software for remote-controlling the amplifiers 1 is preferably prestored in the HDD 22. When the remote controlling software is to be executed, it is read out from the HDD 22 into the memory 21. Then, the CPU 20 executes the remote controlling software read into the memory 21, so that the PC 2 functions as the control apparatus for remote-controlling the amplifiers 1 resident on the network.

Figure 4:
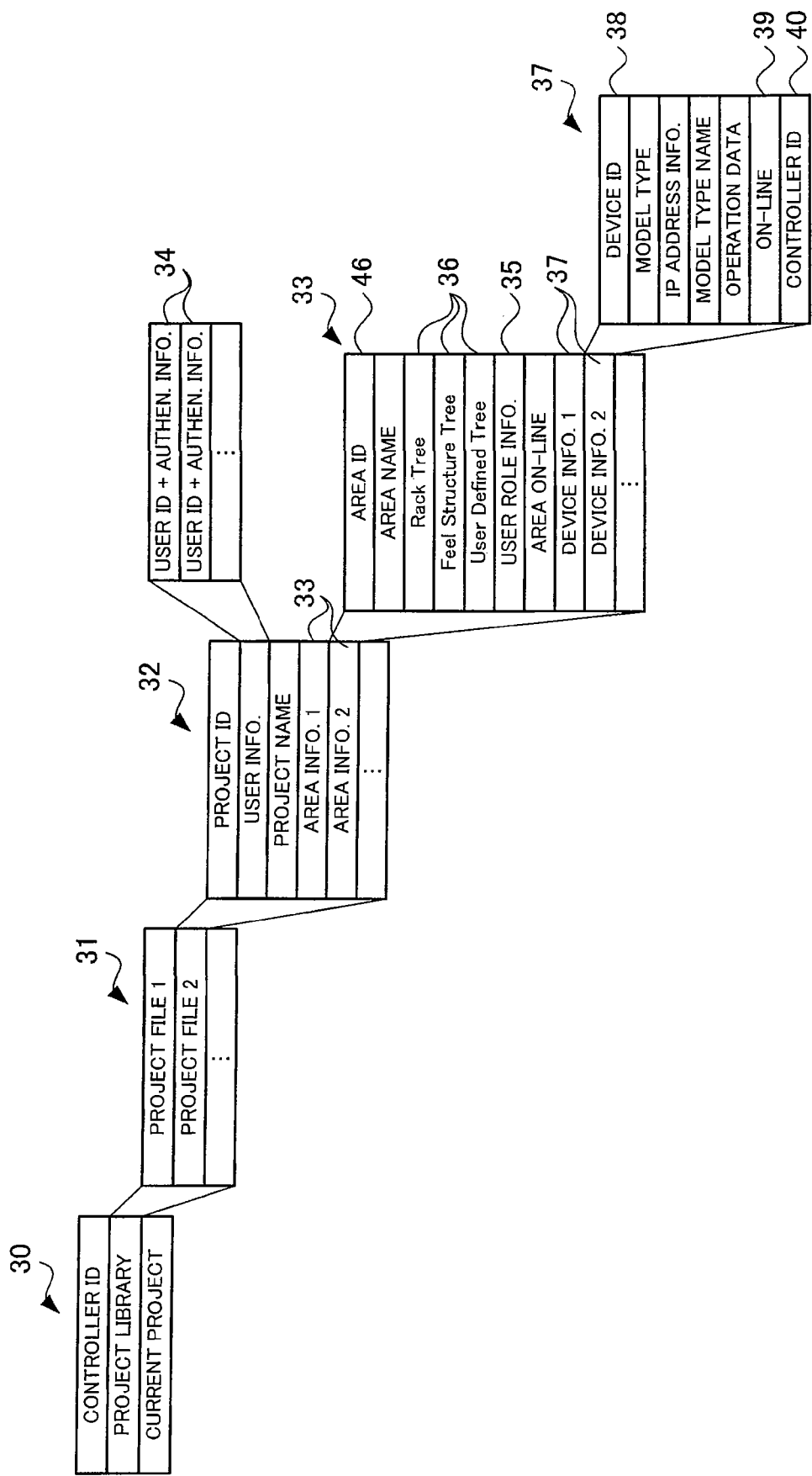
FIG. 4 is a diagram showing an example organization of data prepared by remote controlling software of the personal computer.

FIG. 4 is a diagram showing an example organization of data which the remote controlling software prepares in the memory of 21 and HDD 22 of the PC 2. These data are managed in a hierarchical structure as shown in FIG. 4, and the hierarchical structure corresponds to a structure with which the sound system is managed by the remote controlling software.

Hierarchical level indicated at reference numeral 30 includes data of a controller ID, a project library, and a current project. The controller ID is ID information that identifies the PC 2 in question or the remote controlling software installed in the PC 2 on the network. For example, the controller ID is in the form of a MAC (Media Access Control) address, an IP address of the PC 2, ID information that identifies the remote controlling software installed in the PC 2, or a combination of these addresses and information. The controller ID is stored, for example, in the memory (RAM) 21.

In the project library that may be provided for example in the HDD 22, there are stored a plurality of project files ("project file 1", "project file 2", . . . ) as indicated at 31. Each of the project files includes various data necessary for controlling the amplifiers 1 connected to the network. Group of the data stored in each such project file constitutes one project. Further, the current project is a storage area for storing the data group of one project file currently activated by the remote controlling software, and it is provided, for example, in the memory (RAM) 21. When the remote controlling software is to be executed, one project file is loaded from the project library into the current project storage area. The project stored in the project file loaded into the current project storage area is a project (current project) to be currently controlled by the remote controlling software.

As indicated at reference numeral 32, each of the project files includes a project ID, user information, project name and a plurality of pieces of area information 33. The project ID is ID information that identifies one project from among the plurality of project files contained in the project library. Each of the project files contained in the project library has a different or unique project ID. The project name is data that is indicative of a name assigned to the project file and that is used, for example, to display the project name on a basic screen as will be later described. Each of the project files contained in the project library also has a different or unique project name. Such a project file name may be automatically created by the remote controlling software, or a desired project file name may be set by a user of the system.

The user information of each of the project files includes one or more pieces of account information 34 which correspond to users who have their respective accounts for logging in to the project. Namely, such account information 34 is created per project file. Only such a user who has the account information 34 in the project file can open and use the project file. Each of the pieces of account information 34 includes a user ID and authentication information. The user ID is ID information that identifies one user from among the plurality of users. The authentication information is, for example, a password associated with the user ID.

Each of the project files has stored therein pieces of area information ("area information 1", "area information 2", . . . ) 33 corresponding to "areas" created in the project file. Each of the "areas", as noted above, is a unit of remote control in the project. Each of the area information 33 contains various data to be used for remote control of the corresponding area.

Each of the pieces of area information 33 also includes: an area ID 46; area name; group information 36 comprising "Rack Tree" information; "Feed Structure Tree" information and "User Defined Tree" information; user role information 35; information indicative of an "On-Line" status of the area; and device information ("Device Information 1", "Device Information 2", . . . ) 37 corresponding to one or more amplifiers registered in the area. If any interface device for connecting an amplifier to the network is included in the area in question, device information corresponding to the interface device may also be included in the area information 33.

The area ID 46 is ID information that identifies one area from among the plurality of areas created in the project. Each of the areas in the project has a unique area ID 46. The area name is data that is indicative of a name assigned to the area and that is used, for example, to display the area name on the basic screen as will be later described. Each of the areas in the project has a unique area name. Such an area name may be automatically created by the remote controlling software, or a desired area name may be set by the user.

The user role information 35 is information defining rights (roles) given in the area to the individual users having the account information in the project. Namely, the "user roles" are information indicative of rights given to the individual users having their respective accounts in the project. The user roles or rights consist of five major types that are "Admin", "Power User", "User", "Guest" and "Outsider" if mentioned in descending order of right. The "Admin" indicates a user with a project editing right, area editing right and in-area-amplifier controlling and browsing rights. The "Power User" indicates a user with an area editing right and in-area-amplifier controlling and browsing rights. The "User" indicates a user with in-area-amplifier controlling and browsing rights. The "Guest" indicates a user with an in-area-amplifier browsing right. The "Outsider" indicates a user with no particular right in the area, i.e. having no account (namely, no user role information 35) in the area.

Figure 5:
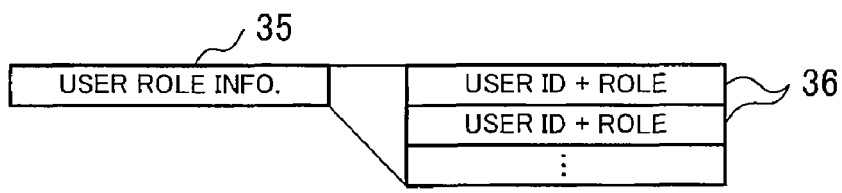
FIG. 5 is a diagram showing details of user role information shown in FIG. 4.

FIG. 5 is a diagram showing details of the user role information 35 stored in the area information 33. The area information 33 includes a plurality of pieces of user role information 35 corresponding to all of users having their respective account information 34 in the project. The user role information 35 of each of the users includes a user ID uniquely identifying the user, and a user role (i.e., one of values indicative of the above-mentioned five types of user roles) given in the area to the user corresponding to the user ID. The user ID included in the user role information 35 is the same as that included in the account information 34 of the user. Thus, the role of the user in the area can be identified by reference to the user ID in the account information 34 of the user and the user role information 35 corresponding to the user ID. Because the user role information 35 is set per area, the user's role based on the user role information 35 is defined per area. For example, even a user having the account information 34 in the project is not permitted to control or monitor amplifiers in a given area if the user role information 35 in that given area indicates that the user does not have a sufficient right to do so.

Referring back to FIG. 4, the group information 36, "Rack Tree", "Feed Structure Tree" and "User Defined Tree", is information for managing the amplifiers, registered in the area in question, in divided groups, i.e. on the group-by-group basis. More specifically, the "Rack Tree" is information describing a construction of groups (rack groups) into which the amplifiers are grouped according to the racks used, the "Feed Structure Tree" is information describing a construction of groups (feed structure groups) into which channels of the amplifiers are grouped according to the speakers to which signals are to be output from the channels, and "User Defined Tree" is information describing a setup of groups defined as desired by the user (user defined groups). These information 36 will be generically referred to as "group information". The group information 36 is used when the amplifiers registered in each of the areas of the project are to be displayed in a group-by-group tree configuration. The above-mentioned three pieces of the group information 36 include names assigned to the individual groups, and information that indicates constructions of the individual groups (i.e., information that identifies the amplifiers registered in the groups and information that identifies locations, in the groups, of the amplifiers), etc.

Pieces of the device information 37 correspond to the amplifiers in one-to-one relation, and each of the pieces of the device information 37 includes information necessary for remote-controlling the corresponding amplifier 1 via the remote controlling software of the PC 2. The remote controlling software creates, in each of the pieces of the area information 33, one or more pieces of the device information 37 corresponding to one or more amplifiers 1 registered in the area.

Each of the pieces of the device information 37 includes a device ID 38, model type information, IP address, device name, amplifier operation data, information 39 indicative of an "On-Line" status of the device information 37 in question, and controller ID 40.

The device ID 38 includes a MAC (Media Access Control) address of the actual amplifier 1 corresponding to the device information 37 in question, and an in-area ID uniquely identifying the device information 37 in the area. The in-area ID is data either automatically created by the remote controlling software or manually set by the user using the user interface 15 of the amplifier 1 corresponding to the device information 37 when the device information 37 has been registered in the area (or at the time of creation of the device information 37). The MAC address is data which the amplifier 1 fixedly retains and which can not be set by the remote controlling software or by the user. The device ID 38 is data that is used by the remote controlling software, for example, in associating the device information 37 and the actual amplifier 1.

The model type information is information that identifies a model type of the amplifier 1 corresponding to the device information 37, which comprises for example a model type name or model type ID (i.e., unique ID assigned to the model type by a maker of the amplifier). The IP address is an Internet Protocol address assigned to the amplifier 1 corresponding to the device information 37. The device name is a name (amplifier name) that is assigned to the amplifier 1 corresponding to the device information 37 by the user via the remote controlling software, and that is used, for example, when the name of the amplifier 1 is to be displayed on the later-described basic screen.

The operation data are indicative of settings of various parameters necessary for remote-controlling the amplifier 1 corresponding to the device information 37. The amplifier operation data include, for example, sound volume level parameter settings of the individual channels of the amplifier etc. The amplifier operation data are in a similar format to the operation data stored in the memory 11 of the amplifier 1 corresponding to the device information 37. Model type definition information for defining and editing the operation data of the individual model types is stored in a model type library (not shown) provided in advance in the remote controlling software. The model type definition information of each of the model types includes a name and ID of the model type, information indicative of the format of the operation data, an editing program for editing the operation data, etc. Further, the operation data include, for example, channel-by-channel gain parameter values, attenuator parameter values, phase switching parameter values, delay time parameter values, equalizer parameter values, etc.

In the On-Line status information 39, there is stored one of values indicative of "ON-LINE", "MONITOR" and "OFF-LINE". Thus, the On-Line status information 39 indicates which of the "ON-LINE", "MONITOR" and "OFF-LINE" states the device information 37 is currently in.

The controller ID 40 stored in the device information 37 is information that identifies a PC (control master) 2 currently controlling the amplifier 1 corresponding to the device information 37; if the PC 2 in question itself is the control master of the amplifier 1 corresponding to the device information 37, a value of the controller ID stored in the memory 21 of the PC 2 (i.e., controller ID stored in the hierarchical level indicated at reference numeral 30) is written as the controller ID 40. If, on the other hand, another PC 2 than the PC 2 in question is the control master of the amplifier 1 corresponding to the device information 37, the controller ID of the other PC 2 is written as the controller ID 40. The controller ID 40 stored in the device information 37 is data that is prepared only when the project in question has been loaded into the current project; more specifically, it is received from the amplifier 1 at the time of a later-described synchronization process. Namely, while the project is stored in the project library (HDD 22), data of the controller ID 40 in the device information 37 is kept empty.

Figure 6:
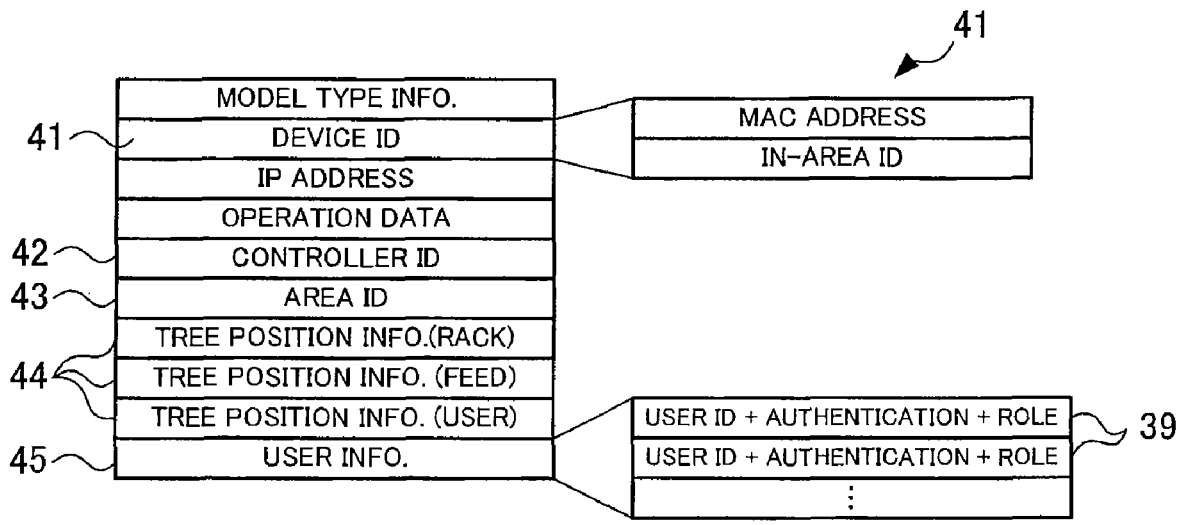
FIG. 6 is a diagram explanatory of an example organization of data stored in a memory of the amplifier.

FIG. 6 is a diagram explanatory of an example organization of data stored in the memory 11 of each of the amplifiers 1. As shown, the memory 11 of the amplifier 1 has stored therein:

model type information; device ID 41; IP address; operation data; controller ID 42; area ID 43; group information 44 including information indicative of a position of the amplifier 1 in the "Feed Structure Tree"; and information indicative of a position of the amplifier 1 in the "User Defined Tree"; and "User Info" information 45. Namely, each of the amplifier 1 in the sound system has stored in its memory 11 the abovementioned information pertaining only to itself. Of the abovementioned stored information, the controller ID 42, area ID 43, group information 44 and User Info information 45 are necessary only for being controlled or monitored by any one of the PCs 2, but not necessary for basic behavior of the amplifier 1. One primary feature of the present invention is that the data necessary for the amplifier 1 to be controlled or monitored by the PC 2, such as the User Info information 45 and group information 44, are stored in the memory 11 of the amplifier 1.

The model type information is information that identifies a model type of the amplifier 1, which is for example in the form of a model type name or model type ID of the amplifier 1. The device ID 41 comprises a MAC address and an in-area ID. The MAC address is an address which the amplifier 1 fixedly retains and can not be set by the user. The in-area ID is information which identifies the amplifier 1 in the area where the amplifier 1 is registered therewith (more specifically, the area in the PC 2 where the device information 37 corresponding to the amplifier 1 is registered). The in-area ID is either automatically created by the remote controlling software when the device information 37 corresponding to the amplifier 1 is registered in the area, or manually set by the user using the user interface section (operation panel) 15 of the amplifier 1. The device ID 41 is data to be used by the remote controlling software when associating (matching) the amplifier 1 with the device information 37. The IP address is an address assigned to the amplifier 1 on the network.

The operation data of FIG. 6 comprise settings of various parameters necessary for remote controlling of the behavior of the amplifier 1. The operation data include, for example, settings of various parameters, such as channel-by-channel gain parameter values, attenuator parameter values, phase switching parameter values, delay time parameter values and equalizer parameter values. The CPU 10 gives instructions to the DSP 13 on the basis of the operation data and controls the sound signal processing performed by the DSP 13. The operation data of the amplifier 1 are either remote-controlled by the PC 2, or controlled by the user using the user interface section 15.

The controller ID 42 stored in the amplifier 1 is data corresponding to the controller ID stored in the memory of the PC 2 that is the control master of the amplifier 1. The controller ID 42 is received from the PC (i.e., control-master PC) 2 at the time of the later-described synchronization process. The controller ID 42 is used, for example, in determining whether the amplifier 1 is currently under control by the PC 2. When the controller ID 42 has any value recorded therein, it means that the amplifier 1 is currently under control by any one of the PCs 2, but when the controller ID 42 has no value recorded therein, it means that the amplifier 1 is not currently under control by any one of the PCs 2. The area ID 43 is a unique ID assigned to the area in which the amplifier 1 is registered. By the memory 11 of the amplifier 1 having the area ID stored therein, the PC 2 can know, at the time of the later-described synchronization process, with which of the areas in the current project the amplifier 1 is registered. The area ID 43 is received from the PC2, which is the control master of the amplifier 1, at the time of the later-described synchronization process. Alternatively, the area ID 43 may be set manually by the user using the user interface section 15.

The group information (amplifier position information) 44 identifies positions of the amplifier in the "Rack Tree", "Feed Structure Three" and "User Defined Tree" groups. The group information 44 of each of the amplifiers 1 is based on the group information 36 stored in the PC 2. Whereas the group information 36 stored in the PC 2 comprises information indicative of organizations of the individual groups created in one area (i.e., information uniquely identifying the amplifiers registered in the individual groups) and information identifying positions of the amplifiers in the individual groups, the group information 44 stored in each of the amplifiers 1 only need to identify the groups which with the amplifier 1 is registered and positions, in the individual groups, of the amplifier 1. The group information 44 stored in the amplifier 1 is set, at the time of the later-described synchronization process, on the basis of the group information 36 (i.e., group information 36 included in the area information 33 having the amplifier 1 registered therein) received from the control-master PC 2 of the amplifier 1.

The "User Info" information 45 comprises one or more pieces of "User Info" information 39 corresponding to one or more users of the PCs 2. For each of the users, the "User Info" information comprises account information including a user ID of the user and authentication information corresponding to the user ID, and information defining rights (user roles) assigned to the user with respect to the amplifier 1. The "User Info" information 45 is created, at the time of the later-described synchronization process, on the basis of the user information (account information 34) stored in the current project and received from the control-master PC 2 of the amplifier 1 and on the basis of the user roll information 35 included in the area information 33 having the amplifier 1 registered therein. Namely, the "User Info" information 45 comprises data that, for each of the users, associates the account information 34 with the user roll information 35 in the area having the amplifier 1 registered therewith.

Figure 7:
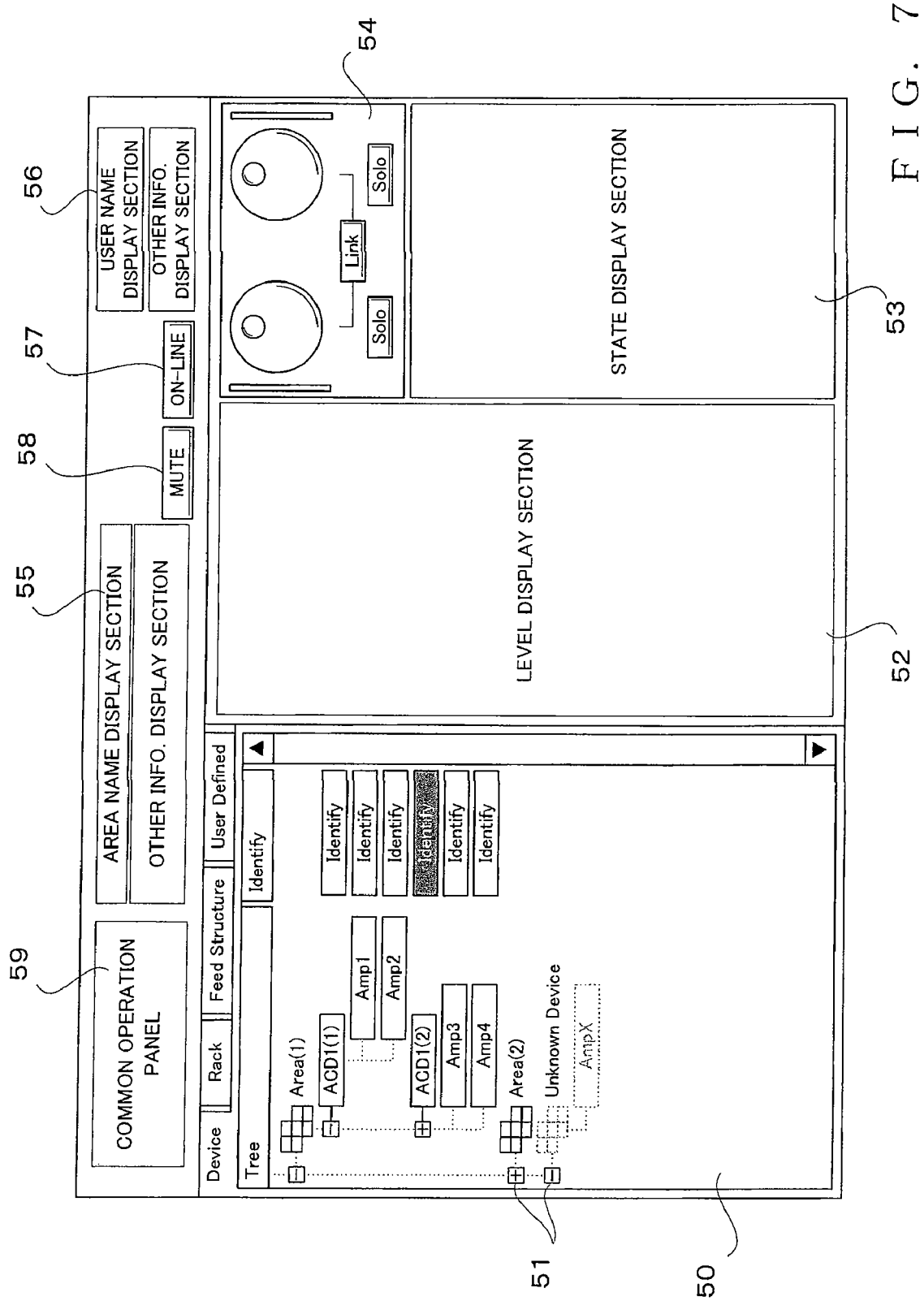
FIG. 7 is a diagram showing an example setup of a "basic screen" displayed, via the remote controlling software, on a display of the personal computer.

FIG. 7 is a diagram explanatory of an operation screen provided by the remote controlling software, which particularly shows an example structure of the "basic screen" for performing overall operation for functions provided by the remote controlling software. Once one project is selected as an object of control upon start-up of the remote controlling software in the PC 2, there appears the "basic screen" for controlling and monitoring the project selected or set as the object of control (i.e., current project).

On the basic screen, a tree display section 50 is an area for displaying a setup of the project set as the object of control (i.e., current project) in a tree format on the basis of data contained in the current project. Namely, in correspondence with the data structure of the project file, the tree display section 50 displays groups of visual representations corresponding to the areas at the uppermost hierarchical level, below which groups of visual representations indicative of groups and amplifiers or channels of amplifiers are displayed in a branched configuration. For each of the visual representations, a name of the corresponding tree component (i.e., area name, group name, amplifier name, or the like) is displayed on the basis of the data contained in the current project. If there is any lower-hierarchical-level tree component below a given tree component, a GUI component 51 is displayed to indicate whether or not the lower-hierarchical-level tree component is to be displayed; a "−" mark is displayed while the lower tree component is being displayed, but a "+" mark is displayed while the lower tree component is being hidden.

As noted above, the setup of the project selected or set as the object of control, displayed in the tree display section 50, is based on the data of the current project stored in the PC 2. Therefore, each visual representation indicative of an amplifier in the tree display section 50 represents a virtual amplifier corresponding to (virtual) device information 37 created in the project file of the object of control. In this specification, the virtual amplifier created in the project file (i.e., device information 37 stored in the PC 2) will hereinafter be referred to as "virtual device" while each amplifier 1 actually connected to the sound system will hereinafter be referred to as "real device", as necessary.

By the user selecting any one of groups of the visual representations displayed in the tree display section 50, values of various parameters of the area, group, amplifier (virtual device) or amplifier channel corresponding to the selected or designated visual representation group can be developed in a level display section 52, state display section 53 and attenuator operation section 54. These sections 52-54 are areas for the user to perform principal operation for remote-controlling the amplifier, and detailed constructions of the sections 52-54 will be later discussed.

Further, the basic screen of FIG. 7 also includes: an area name display section 55 for displaying a name of an area currently set as an object of control (i.e., area selected in the tree display section 50, area which a group selected in the tree display section 50 belongs to, area which an amplifier selected in the tree display section 50 belongs to, or area which an amplifier channel selected in the tree display section 50 belongs to); a user name display section 56 for displaying a name (or ID) of a user currently logging in to the remote controlling software; an "One-Line" button image 57 for starting a dialog function for synchronization between virtual and real devices; a button image 58 for instructing switching between mute-on and mute-off states of the area currently selected as the object of control; and a common operation panel 59 for performing operation common to the entire basic screen. The common operation panel 59 may include, for example, GUI components for giving an instruction to read out (or load) a project file into the current project, an instruction to store the project file, an instruction to newly create a project file, etc. The basic screen may further include an "other information display section" for displaying other information, such as a right or role ("Admin", "Power User", "User" or "Guest") given to the currently-logging-in user in the area currently set as the object of control.

Figure 8A:
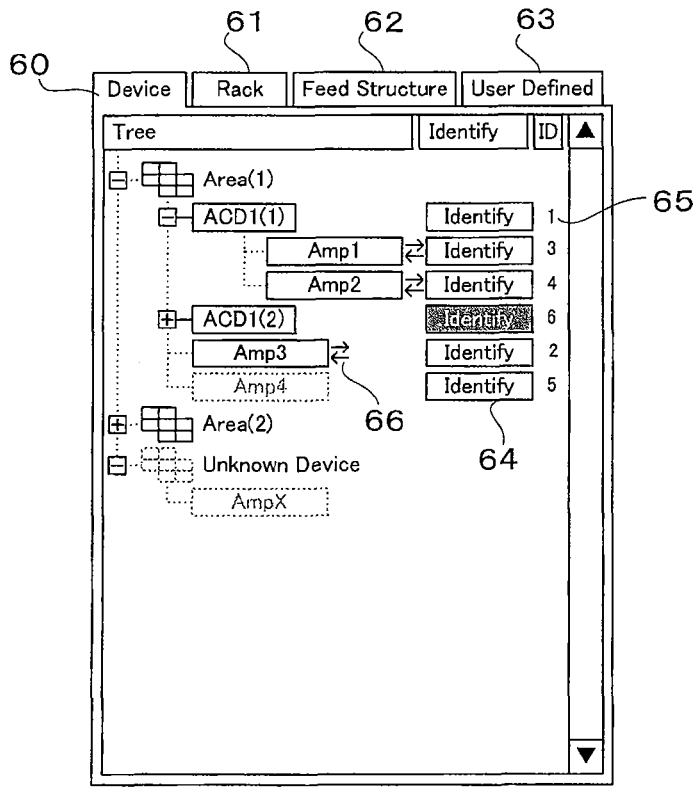
Figure 8B:
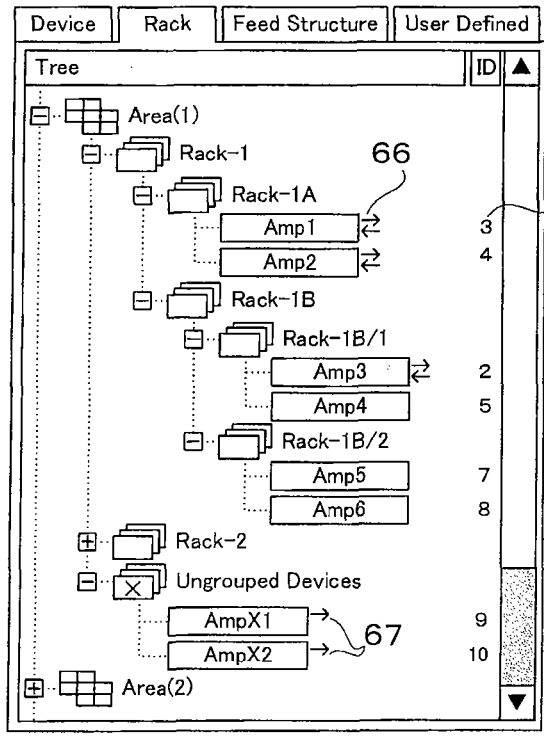
Figure 8C:
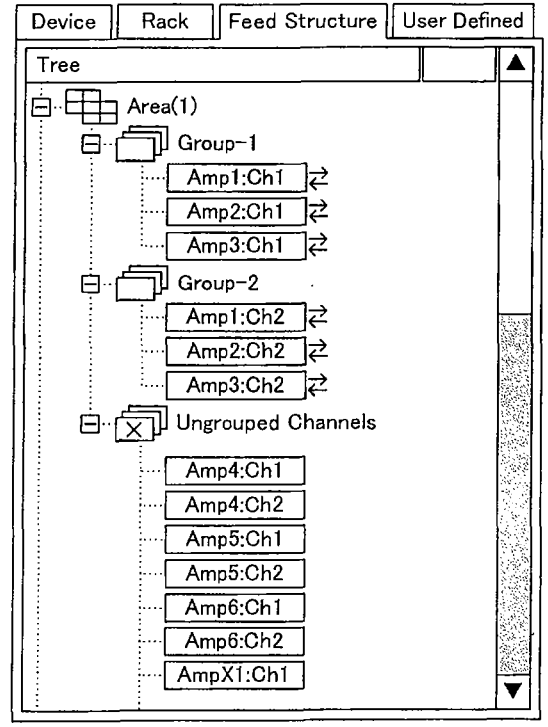

FIGS. 8A-8C are diagrams showing in more detail of the construction of the tree display section 50. The tree display section 50 includes, in its upper end regions, four tab images: "Device" tab 60; "Rack" tab 61; "Feed Structure" tab 62; and "User Defined" tab 63. The user can select any one of the tab images 60-64 to thereby switch between different styles of the tree display on the tree display section 50.

When the "Device" tab 60 is selected, the setup of the project is displayed in the tree display section 50 in a "device tree" display style as shown in FIG. 8A. The "device tree" is a display style in which virtual devices registered in the areas are displayed on an area-by-area basis. In the "device tree", each device connected directly to the network is displayed immediate below any one of the areas or immediately blow "Unknown Device" and never constitutes a group. In the illustrated example of FIG. 8A, an amplifier "Amp3", and interface devices "ACD(1)" and "ACD(2)" for connecting the amplifier to the network are located immediately below "Area (1)", from which it can be seen that "Amp1" and "Amp2" are connected to "ACD(1)". Namely, ungrouped in-area devices other than the amplifiers 1 devices can also be displayed in the device tree. Note that a maximum of 32 amplifiers can be connected to each interface device (ACD).

Further, in the "device tree", "Identify" button images 64 are displayed, in correspondence with visual representations of individual virtual devices, for identifying real devices corresponding to the virtual devices. The user of the PC 2 can identify a real device associated with a given virtual device, by operating the "Identify" button image 64 corresponding to the given virtual device. As one example way of identifying the associated real device, an LED display provided in the associated real device may be illuminated. Further, in the "device tree", an ID display field 65 is provided, in correspondence with the visual representations of the individual virtual devices, for displaying the in-area IDs of the individual virtual devices. In the illustrated example of FIG. 8A, six virtual devices "Amp1", "Amp2", "Amp3", "Amp4", "ACD(1)", "ACD(2)" registered in "Area(1)" are assigned serial numbers "1"-"6", consecutively running in the area, as the area IDs.

When the "Rack" tab 61 is selected, the setup of the project is displayed in the tree display section 50 in a "rack group tree" display style as shown in FIG. 8B. The "rack group tree" is a display style in which amplifiers registered in the areas are displayed divided in "rack groups" on the basis of "Rack Tree" information included in the area information of the individual areas. The rack group is a group where the amplifiers are grouped in accordance with the racks having the amplifiers mounted thereon. Further a rack group can be created below a given rack group in a nested manner; namely, the amplifiers in a given group can be further divided into smaller groups. In the illustrated example of FIG. 8B, two groups "Rack-1A" and "Rack-1B" are created below one rack group "Rack-1" created in "Area(1)", and two groups "Rack-1B/1" and "Rack-1B/2" are created below one rack group "Rack-1B". Each virtual device that is registered in a given area but not classified into any rack group is classified into the "Ungrouped Device" category. In the illustrated example of FIG. 8B, "AmpX1" and "AmpX2" are classified into the "Ungrouped Device" category. In the "rack group tree" too, an ID display field 65 is provided, in correspondence with the visual representations of the individual virtual devices, for displaying the in-area IDs of the individual virtual devices.

Further, when the "Feed Structure" tab 62 is selected, the setup of the project is displayed in the tree display section 50 in a "feed structure group tree" display style as shown in FIG. 8C. The "feed structure group tree" is a display style in which the channels of the amplifiers registered in any one of the areas are displayed divided in feed structure groups on the basis of the area information 33 of the area. The feed structure group is a group in which the channels of the amplifiers are grouped in accordance with the speakers to which signals of the channels are to be output (i.e., destination speakers). This grouping scheme permits, for example, grouping of the channels of the amplifiers of high, medium frequency and low frequency bands connected to left (L) channels of stereo speakers into a first group ("Group-1" of FIG. 8C), channels of the amplifiers of high, medium frequency and low frequency bands connected to right (R) channels of the stereo speakers into a second group ("Group-2" of FIG. 8C), etc. Therefore, in the "feed structure group tree", "Amp: ch1" etc. are displayed in the individual groups. Further, in the "feed structure group tree", channels of the virtual devices which are located in the area but not classified into any feed structure group are classified into the "Ungrouped Channels" category.

When the "User Defined" tab 63 is selected, the setup of the project is displayed in the tree display section 50 in a "User Defined Tree" display style. The user defined tree is a display style where the channels of the amplifiers in any one of the areas are grouped in accordance with a user defined tree grouping scheme, and where the amplifiers registered in the area are grouped per user defined tree on the basis of "user Defined Tree" included in the area information 33 of the area. Because the user defined tree is substantially similar in construction to the feed structure group tree of FIG. 8C except that different tree information in the group information 36 is referred to for the grouping, illustration of the user defined tree is omitted.

In the tree display section 50, as noted above, a plurality of areas are set in the project, the amplifiers or amplifier channels are grouped into one or more groups for each of the areas, the instant embodiment can achieve the advantageous benefit that any one of the tree display styles can be selected in accordance with a grouping scheme (definition) of a different perspective, so that, in controlling the individual amplifiers, it is easy to reach any desired amplifier or amplifier channel from the tree display section 50, as well as the advantageous benefit that the plurality of amplifiers can be controlled collectively on a group-by-group basis by selection, as an object of control, of a desired group.

Further, each of the visual representations corresponding to the virtual devices, displayed in the device and group trees in the tree display section 50, is displayed in one of two display styles: "real-device-present" (or "substance-present") indicating display style indicating that there is a corresponding real device on the network; and "real-device-absent" (or "substance-absent") indicating display style indicating that there is not a corresponding real device on the network. In the instant embodiment, if there is a real device, corresponding to a virtual device, on the network, the visual representation corresponding to the virtual device is indicated in solid line, while, if there is not a corresponding real device on the network, the visual representation corresponding to the virtual device is indicated in broken line.

In the tree display section 50, each virtual device or channel of the virtual device, registered in any one of the areas in the project file, is displayed as an "in-area virtual device" in both of the device tree and group trees. Each visual representation corresponding to an in-area virtual device that could be successfully associated with a real device through later-described matching between the virtual devices and the real devices is displayed in the real-device-present indicating display style, i.e. in solid line. In the illustrated example of FIG. 8A, "Amp1" is one example of the visual representation indicative of an in-area virtual device displayed in the real-device-present indicating display style. Each visual representation corresponding to an in-area virtual device that could not be appropriately associated with any real device through the later-described matching between the virtual devices and the real devices is displayed in the real-device-absent indicating display style, i.e. in dotted line. In the illustrated example of FIG. 8A, "Amp4" is one example of the visual representation indicative of an in-area virtual device displayed in the real-device-absent indicating display style.

If a real device is detected in the sound system but could not be successfully associated with a virtual device in any one of the areas of the project file through the matching process, the remote controlling software automatically creates a visual representation corresponding to the detected real device in an "Unknown Device" category in the device tree; a virtual device indicated by such a visual representation will be referred to as "outside-area virtual device". In the illustrated example of FIG. 8A, "AmpX" is an example of the visual representation corresponding to the outside-area virtual device, and such a visual representation is indicated in dotted line (i.e., in the real-device-absent indicating display style).

This means that, after creation of "Amp1" as an outside-area virtual device, the real device corresponding to "Amp1" has been disconnected from the network. Note that a visual representation corresponding to an outside-area virtual device is not displayed in the group trees. Visual representation of a virtual device whose corresponding real device has been disconnected may be erased from the tree instead of being displayed in dotted line.

In the illustrated examples of FIGS. 8A-8C, each pair of two-direction arrow images 66, displayed to the right of the visual representation corresponding to a virtual device, indicates that the On-Line status of the corresponding virtual device is "ON-LINE". Each one-direction arrow 67, displayed to the right of the visual representation corresponding to a virtual device, indicates that the On-Line status of the corresponding virtual device is "MONITOR". Further, for each virtual device whose On-Line status is "OFF-LINE", no mark is displayed to the right of the corresponding visual representation. The On-Line status of each of the virtual devices depends on the On-Line status information 39 stored in the corresponding device information 37.

The "ON-LINE" state is a state where a "User" having the in-area amplifier controlling right can remote-control the corresponding real device via the PC 2. The "MONITOR" state is a state where a "Guest" having the in-area amplifier browsing right can remote-browse operating states of the corresponding real device via the PC 2. Further, the "OFF-LINE" state is a state where no remote communication is performed between the virtual device and the real device. Once the operation data of any one of the virtual devices are edited by the remote controlling software, the data of the current project are updated in accordance with the content of the editing operation; however, the editing operation is not be reflected in the real device.

Figure 9A:
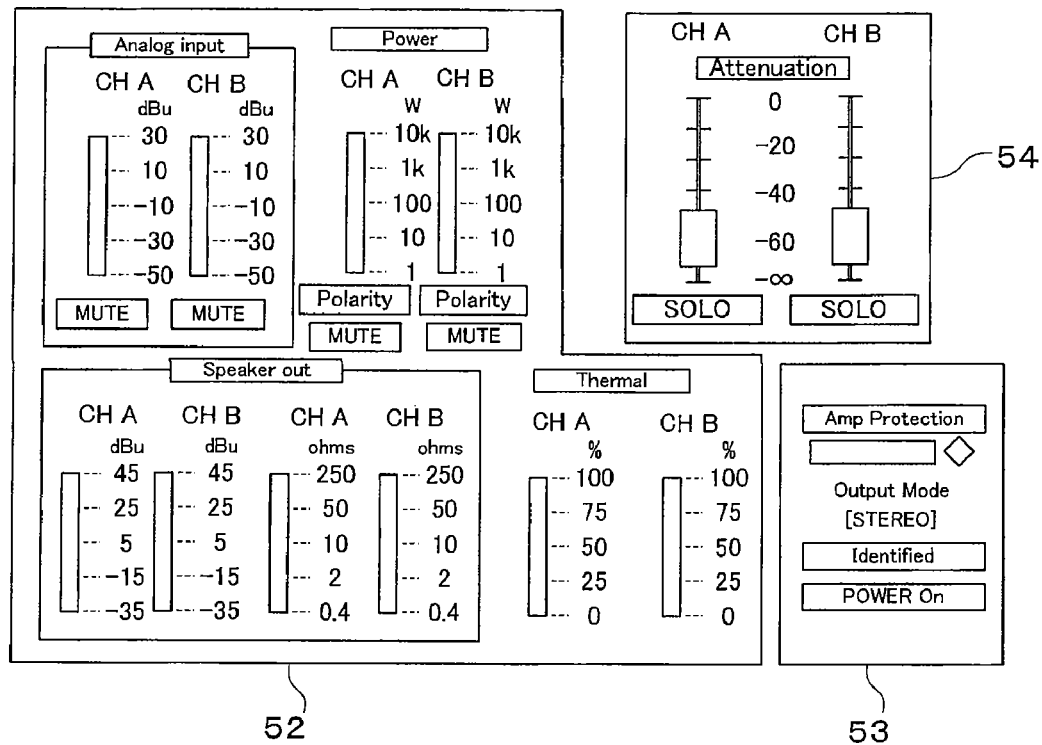
Figure 9B:
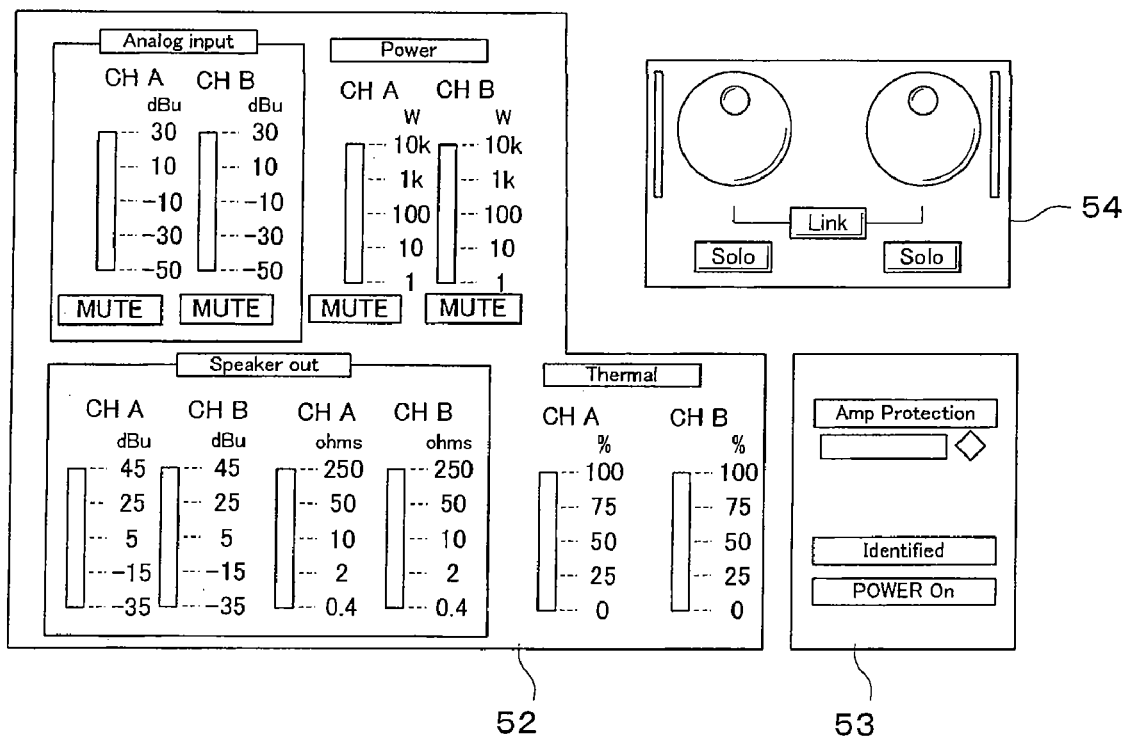

FIGS. 9A and 9B are diagrams showing examples of details of the areas 52-54 on the basic screen of FIG. 7. More specifically, FIG. 9A shows an example screen structure displayed when an amplifier has been designated individually in the tree display section 50, and FIG. 9B shows an example screen structure displayed when an area or group has been designated, i.e. displayed for collectively controlling a plurality of amplifiers.

In FIG. 9A or 9B, the level display section 52 includes level meters for displaying sound volume levels of input and output signals, impedance levels of loads connected to output terminals and output power level of an area, group, amplifier or amplifier channel, designated in the tree display section 50, for each of the channel (two channels "CH A" and "CH B" in FIG. 9), button images for instructing switching between mute-on and mute-off states of input or output signals for each of the channels, output polarity switching switch images, etc. The state display section 53 displays operating states etc. of an area, group, amplifier or amplifier channel designated in the tree display section 50. Further, in the attenuator operation section 54, operator (operating member) images are provided for adjusting an attenuator parameter (sound level attenuation amount), and an attenuator parameter of an area, group or amplifier selected in the tree display section 50 is allocated as an object of control by the operator images. As shown, the screen structures of FIGS. 9A and 9B are generally similar to each other, except that (1) they differ from each other in the construction of the attenuator operation section 54, (2) the screen structure of FIG. 9B has no output polarity switching switch image and (3) no "Output Mode" setting is displayed in the state display section 53 of the screen structure of FIG. 9B.

Next, a description will be given about various processes performed by each of the PCs 2 and amplifiers 1 in the embodiment of the sound system arranged in the above-described manner.

Figure 10:
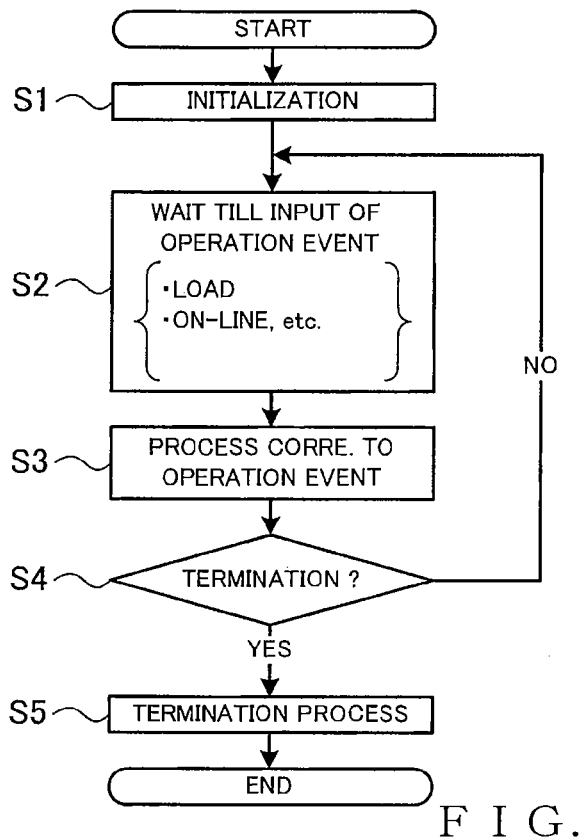
FIG. 10 is a flow chart outlining a general operational sequence performed by the personal computer in accordance with the remote controlling software.

FIG. 10 is a flow chart outlining a main operational sequence performed by the CPU 20 of the PC 2 in accordance with the remote controlling software. Once the remote controlling software is started up on the OS of the PC 2, the CPU 20 performs, at step S1, a predetermined initialization process including activating the basic screen on the display (user interface 24). After completion of the initialization process, the CPU 20 waits until any operation event is input by the user, at step S2. Once any operation event input by the user is detected, the CPU 20 performs a process corresponding to the detected operation event, at step S3. Then, the CPU 20 repeats the operations of steps S2 and S3 until the user instructs termination of the execution of the remote controlling software (i.e., until a YES determination is made at step S4, namely, as long as a NO determination is made at step S4). Once the user instructs termination of the execution of the remote controlling software (YES determination is made at step S4), the CPU 20 performs a predetermined termination process at step S5, so that the execution of the remote controlling software is brought to an end.

The operation event which the CPU 20 awaits at step S2 is an operation event that is input by the user on an operation screen, such as the basic screen, displayed on the display (user interface 24), and that is, for example, one of an instruction for loading a project file, instruction for storing a project file into the current project, editing operation of data in a project, instruction for setting virtual and real devices in the on-line or off-line state, etc. The following paragraphs describe a sequence of operations performed by the CPU 20 at step S3 in response to various operation performed by the user.

Note that rights of users are defined for various editing operation to be explained below, so as to limit users eligible for the respective editing operation. As set forth above, the rights of the users consist Five major types: "Admin" that has all rights to a project; "Power User" that has an area editing right and in-area-amplifier controlling and browsing rights; "User" that has in-area-amplifier controlling and browsing rights; "Guest" that has only an in-area-amplifier browsing right; and "Outsider" that has no particular right in the area. Although the instant embodiment has been described as applying or allocating one of the five types of predetermined users to each user, arrangements may be made to allow the user to define various rights, or there may be provided a right called "Custom" that allows the user to define desired content of a right.

Figure 11:
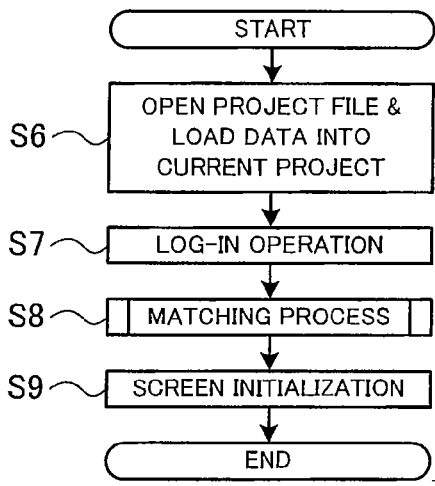
FIG. 11 is a flow chart of an example operational sequence of a process performed by the personal computer when a project-file loading instruction has been input.

FIG. 11 is a flow chart of an example operational sequence of a project-file loading process performed by the CPU 20 when a project-file loading instruction has been input by the user as an operation event. Via the common operation panel 59 of the basic screen shown in FIG. 7, the user can open the project file library 31, select one of the project files from the library 31 and give an instruction for loading the selected project file 32. At step S6, the CPU 20 opens the project file 32 selected by the user and loads the data group, contained in the selected project file 32, into the current project.

At step S7, the CPU 20 performs a log-in (user authentication) process for allowing the user to log in to the project loaded into the current project at step S6. More specifically, the CPU 20 displays, on the display 24, a log-in screen (not shown) for prompting the user to input the user ID and authentication information and then collates the user ID and authentication information, input by the user via the log-in screen, with the pieces of account information (user ID and authentication information) 34 of the user information included in the current project. If the user ID and authentication information input by the user match any one of the pieces of account information 34, the CPU 20 judges that the user authentication has been established and thus permits the user to log in to the current project. In case the user does not have an account in the project, or in case at least one of the user ID and authentication information input by the user is erroneous or invalid, the CPU 20 judges that the log-in operation is a failure, so that the project-file loading operation is brought to an end.

Upon completion of the log-in operation at step S7, the CPU 20 goes to step S8 to perform a matching process. In the matching process, individual real devices connected to the network are detected, the respective devices ID 41 and area IDs 43 are acquired from the detected real devices, and then matching is performed between the acquired area IDs 43 and the area IDs 46 of the individual areas in the current project and between the acquired device IDs 41 and the device IDs 38 of the virtual devices registered in the individual areas in the current project, to thereby perform association between the real devices connected to the sound system and the virtual devices registered in the individual areas. Details of the operational sequence of the matching process will be discussed later with reference to FIG. 23.

Then, at step S9, the CPU 20 performs a screen initialization process, including initial displaying of the tree display section 50 etc., on the basis of results of the matching process at step S8 above. Namely, (1) for each of the in-area virtual devices which has been successfully associated with any one of the real devices, a visual representation is displayed in the device tree and group trees of the tree display section 50 in the real-device-present indicating display style, and (2) for each of the in-area virtual devices which has not been successfully associated with any one of the real devices, a visual representation is displayed in the device tree and group trees of the tree display section 50 in the real-device-absent indicating display style. Further, for each real device which has been detected on the network but can not be associated with any one of the virtual devices in the areas of the project file, a visual representation indicating an outside-area virtual device is automatically created in the "Unknown Device" category of the device tree.

Through the process of FIG. 11, the project selected or set by the user as the object of control is displayed on the basic screen of the display of the PC 2, so that the project can be controlled or monitored via the PC 2.

Figure 12:
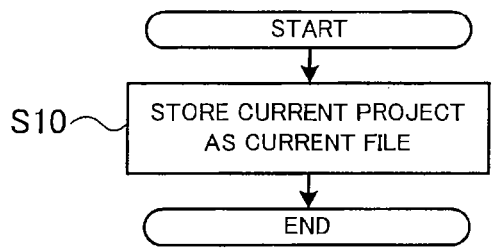
FIG. 12 is a flow chart showing an example operational sequence of a process performed by the personal computer when a project-file storing instruction has been input.

FIG. 12 is a flow chart showing an example operational sequence of a process performed when a project-file storing instruction has been input by the user as an operation event. In response to the project-file storing instruction, the CPU 20 stores, at step S10, the content of the current project, stored in the memory (RAM) 21, as a project file 32 of the project file library 31 provided in the HDD 22. Namely, the content of the current project currently activated in the remote controlling software is stored into the project file library 31 as a project file 32.

Figure 13:
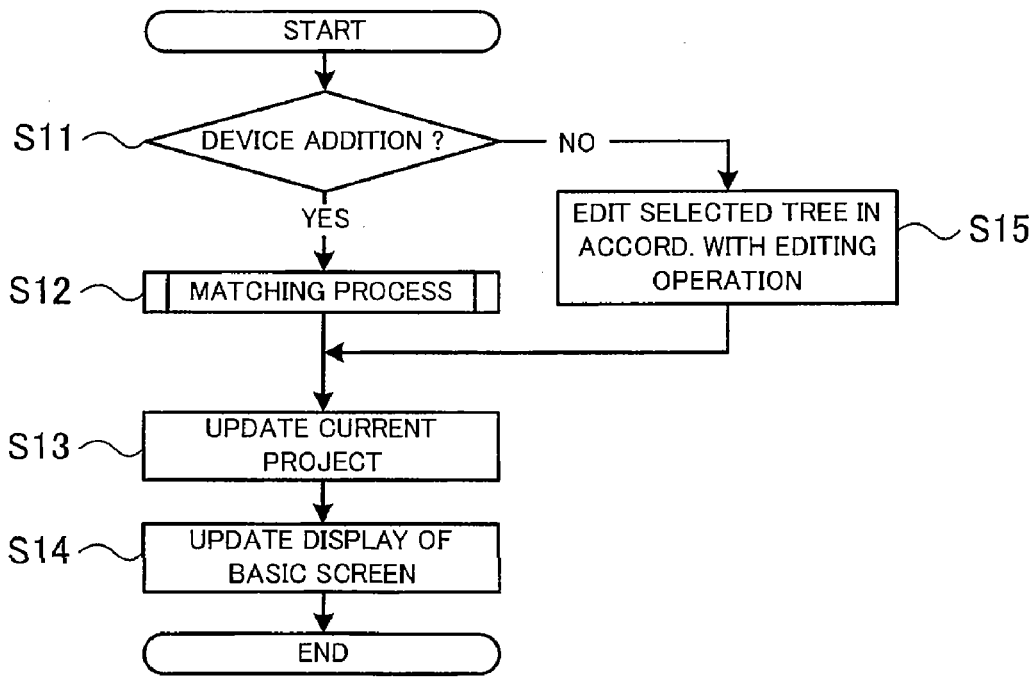
FIG. 13 is a flow chart showing an operational sequence of a process performed by the personal computer when a tree structure has been edited in a tree display section on the basic screen.

FIG. 13 is a flow chart showing an operational sequence of a process performed by the CPU 20 when a user has performed, as an operation event, editing operation on the tree display section 50. The editing operation on the tree display section 50 is operation that is performed by the user having at least the area editing right (i.e., right higher than the "Power User") and that can be executed only when all virtual devices included in an area selected as an object of editing. Examples of the editing operation on the tree display section 50 include operation for newly creating an area, operation for deleting an existing area, operation for newly creating a group in a given area, operation for deleting an existing group, operation for moving a group in a given area to another area, operation for newly creating a virtual device, operation for newly creating a virtual device in a given area, operation for deleting an existing virtual device, operation for moving a virtual device between areas or groups, etc. The user can graphically perform these editing operation using the user interface 24 of the PC 2, such as by drag and drop operation of corresponding visual representations.

If the editing operation performed by the user on the tree display section 50 is operation for adding a new virtual device (YES determination at step S11), the CPU 20 creates device information 37, corresponding to the new virtual device, in the area information 33 of an area designated as an added-to area (i.e., addition destination). For example, as such new device adding operation, the user only has to open a menu of the model type library via the common operation panel 59 of the basic screen, select a desired model type name from among a plurality of model type names displayed on the menu and thereby add a virtual device corresponding to the selected model type name. Minimum necessary data that have to be designated as data for defining the virtual device to be newly added are model type information and in-area ID (i.e., part of the device ID 38) of the virtual device to be newly added. Let it be assumed that, in the instant embodiment, the CPU 20 automatically assigns a serial number running in the added-to area (i.e., number continuing from the last in-area ID in the area) as an in-area ID of the virtual device to be newly added.

Once such a new virtual device is added (YES determination at step S11), the CPU 20 performs the matching process between the added virtual device and the real devices connected to the sound system at step S12 and updates the stored content of the current project in accordance with the new device addition at step S13. Then, the CPU 20 updates the display of the basic screen (tree display section 50) at step S14 so that the new device addition is reflected in the screen.

Further, once editing operation other than new virtual device addition is performed by the user on the tree display section 50 (NO determination at step S11), the CPU 20 edits the structure of a tree, selected as an object of editing, in accordance with the content of the user's editing operation at step S15. Then, the CPU 20 updates the stored content of the current project in accordance with the new device addition at step S13. Then, the CPU 20 updates the display of the basic screen (tree display section 50) in accordance with the content of the user's editing operation at step S14 so that the structure of the tree displayed in the tree display section 50 is changed in accordance with the user's editing operation.

Each user having at least the in-area amplifier controlling right (i.e., right higher than the "User") can edit data of a desired amplifier. Namely, each user having the in-area amplifier controlling right is allowed to select an amplifier to be edited in the tree display section 50, develop data of the selected virtual device in the areas 52-54 of the basic screen of FIG. 7 and change various parameter values, developed in the areas 52-54, using GUI components of areas 52-54 (see FIGS. 9A and 9B). Note that the object of editing here is one of an amplifier, group and area. Namely, if the object of editing is a group or an area, then, in effect, a plurality of amplifiers (virtual devices) are the object of editing. When the virtual device or devices to be edited are in the on-line state, the CPU 20 transmits, to the real device(s) selected as the object of editing, an operation request informing of the content of the amplifier (virtual device) editing operation performed by the user on the basic screen, at step S16 of FIG. 14. If the user having made the operation request has a predetermined sufficient right, the CPU 20 updates the operation data of the device, which it belongs to, in accordance with the content of the editing operation and sends the updated results to the PC 2 (see FIG. 28 for more detail). Then, in the PC 2, the CPU 20 updates the stored content of the current project in accordance with the updated results sent from the real device (s) at step S17, and updates the display of the screen as necessary.

Figure 15:
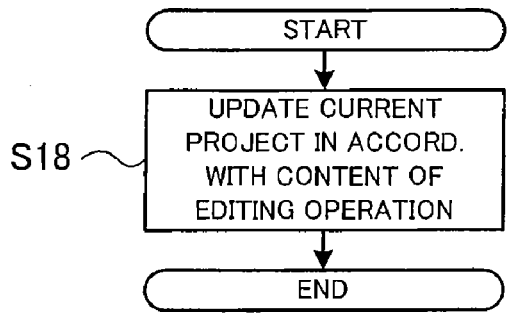
FIG. 15 is a flow chart showing an operational sequence of a process performed by the personal computer when an amplifier (virtual device) has been edited on the basic screen while the amplifier is in an off-line state.

When the virtual device or devices to be edited (i.e., virtual device or devices selected as the object of editing) are in the off-line state, the CPU updates the stored content of the current project in accordance with content of the amplifier (virtual device) editing operation performed by the user on the basic screen at step S18 of FIG. 15, and updates the display of the screen as necessary. In this case, the content of the editing operation performed by the user in the PC 2 is not reflected in the real device(s).

Figure 16:
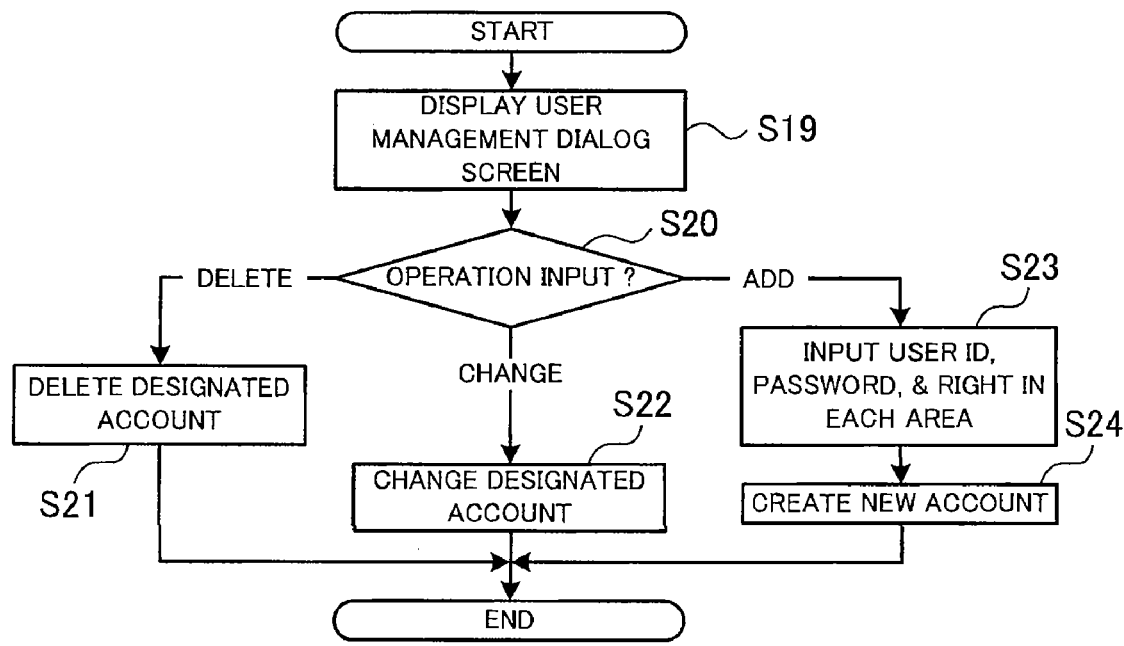
FIG. 16 is a flow chart showing an example operational sequence of a process performed by the personal computer when an account of a project file has been edited.

FIG. 16 is a flow chart showing an example operational sequence of a process performed when a user has performed operation for editing the account registered in the project to be controlled (i.e., the project selected as the object of control). Note that users' accounts are set in the individual project files 31 and managed in accordance with user-by-user account information 34 stored in the project files 31. Such account editing operation can be performed only by a user having all of the aforementioned rights (i.e., rights of the "Admin"), and only when all of the virtual devices in the project are in the off-line state.

The user can make an account editing request, for example, via the common operation panel 59 of the basic screen. Once such an account editing request is input by the user, the CPU 20 displays on the display a user management dialog screen (not shown) designed for account editing, at step S19. Then, the CPU 20 accepts account editing operation performed or input by the user on a user management dialog screen at step S20 and updates the corresponding user information (account information 34), stored in the current project, in accordance with the input account editing operation (steps S21-S24). Namely, when operation for deleting the existing account has been performed, the CPU 20 goes to step S21 to delete from the current project the designated account information 34 and user role information 35 corresponding to the designated account information 34. When operation for changing the existing account has been performed, the CPU 20 goes to step S22 to change, in accordance with the content of the changing operation, at least one of the user ID and authentication information of the designated account information 34, or the user role information 35 corresponding to the account information 34 in the designated area.

When operation for newly adding an account has been performed, the CPU 20 goes to step S23 to create a new account. Namely, the CPU 20 not only newly creates account information 34 in the current project by causing the user to set a user ID and authentication information, but also newly creates user role information corresponding to the account information 34, in each area where the user should a right(s), by causing the user to set a right(a) in the area. Then, at step S24, the CPU 20 proceeds to step S24 to register the new account, created at step S23 above, in the current project. Namely, at step S24, the CPU 20 updates the user information (account information 34) and area-by-area user role information 35, stored in the current project, in accordance with the new account addition.

Next, a description will be given about the synchronization process between the virtual and real devices. Once a user operates the ""One-Line" button image 57 on the basic screen shown in FIG. 7, the CPU 20 displays a "Synchronized Dialog" screen on the display. The "Synchronized Dialog" screen is a screen for the user to give an instruction for setting amplifiers, registered in an area currently selected the object of control via the tree display section 50 of the basic screen, in the on-line (synchronized state) or in the off-line state, and the "Synchronized Dialog" screen includes a "Go On-line" instruction button image 68 and a "Go Off-line" instruction button image 69. Once the user operates the "Go On-line" instruction button image 68 on the "Synchronized Dialog" screen, the CPU 20 performs the synchronization process for setting the virtual devices, registered in the area currently selected the object of control, in the on-line state. Namely, the synchronization process is performed on one area. Further, a "Get Editable" button image 78 of the screen is a button operable by the user to instruct which of the on-line and off-line states should be selected. The "Get Editable" button image 78 in an ON state indicates that the user has selected the on-line state, while the "Get Editable" button image 78 in an OFF state indicates that the user has selected the off-line state. On a device information display section 76 of the screen, there are displayed the device name and ID of each virtual device which is among virtual devices in the area in question and which could be associated with a real device (i.e., each virtual device as a synchronization candidate), and the IP address and On-line status of the corresponding real device.

Figure 18:
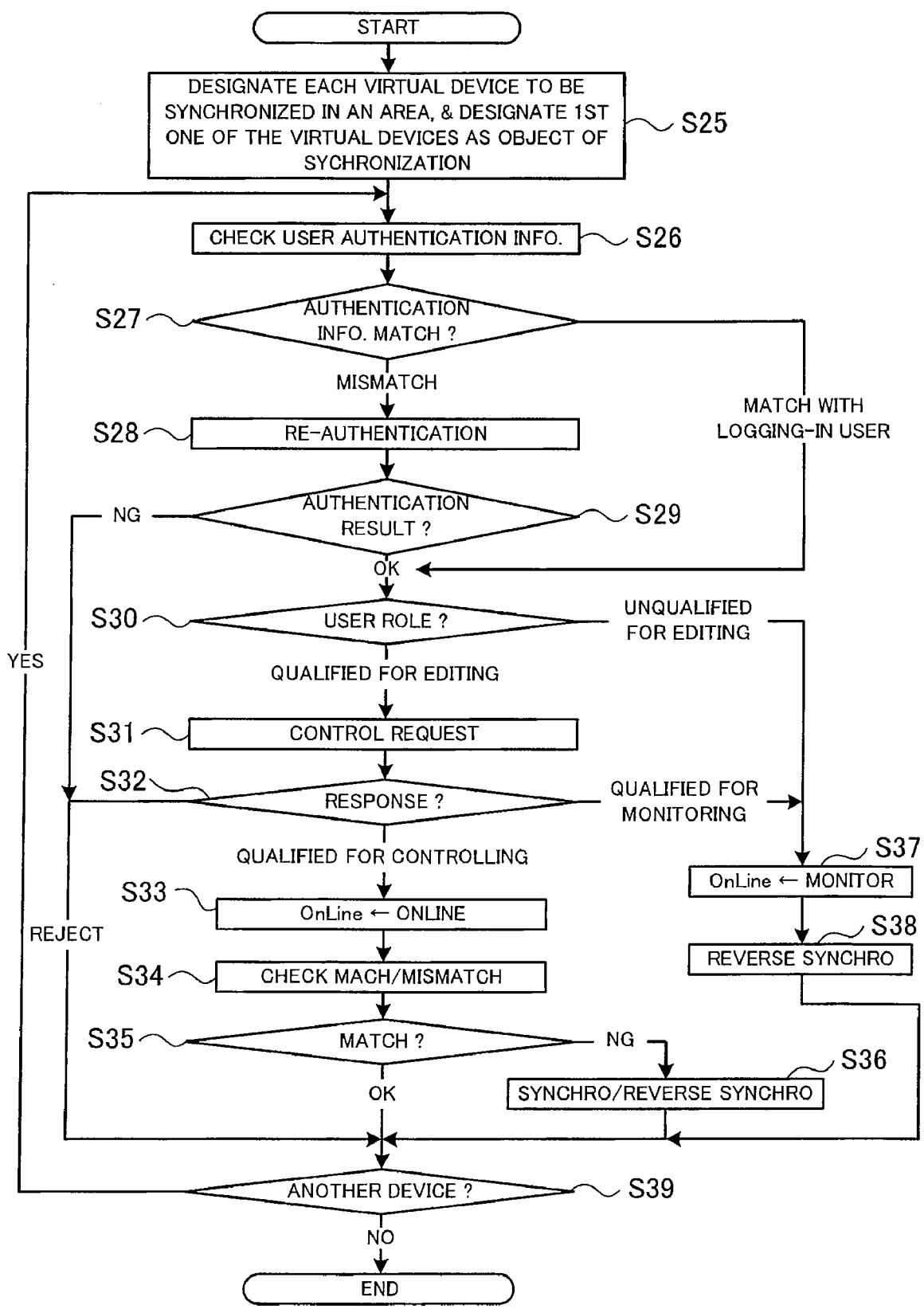
FIG. 18 is a flow chart showing an example operational sequence of a process performed by the personal computer when a "Go On-line" instruction button image has been operated on the "Synchronized Dialog" screen.

FIG. 18 is a flow chart showing an example operational sequence of a process performed by the CPU 20 when a user has operated the "Go On-line" instruction button image 68. At step S25, the CPU 20 not only designates, as a "virtual device to be synchronized", each virtual device which is among the virtual devices within the area in question and could be associated with a real device and whose On-line status is not "ON-LINE", but also designates, as an "object of synchronization", the first such virtual device and the real device corresponding to the first such virtual device. Operations at and after step S26 are sequentially performed on each one of the virtual devices designated as the "virtual device to be synchronized". Thus, each of the virtual devices to be synchronized is a virtual device that is registered in a given area and could be associated with a real device (i.e., in-area virtual device with its corresponding real device present).

At step S26, the UserInfo information 45 is acquired from the virtual device to be synchronized (i.e., selected as the object of synchronization), and a match is checked between a plurality of pairs of the user IDs and authentication information included in the acquired UserInfo information 45 and a pair of the user ID and authentication information of the logging-in user included in the account information 34. If the pair of the user ID and authentication information of the logging-in user is included as-is in the acquired UserInfo information 45 (i.e., "match" at step S27), the CPU 20 proceeds to step S30.

"Mismatch" determination is made at step S27 when the user ID of the logging-in user is not included in the acquired UserInfo information 45, when the user ID of the logging-in user is included in the acquired UserInfo information 45 but the authentication information paired with the user ID does not match the authentication information of the logging-in user, or when the UserInfo information 45 of the real device has already been cleared.

If the authentication information paired with the user ID does not match the authentication information of the logging-in user although the user ID of the logging-in user is included in the acquired UserInfo information 45 and thus the authentication has failed (Mismatch" determination at step S27), the CPU 20 goes to step S28, where a re-authentication operation is performed to prompt the user to input the password (authentication information) by displaying a password input screen. If the password thus input by the user through the re-authentication operation is right or valid, the CPU 20 judges that the authentication has succeeded ("OK" at step S29).

Further, if the user ID of the logging-in user is not included in the acquired UserInfo information 45, or if the UserInfo information 45 of the real device has already been cleared and the logging-in user has no right equal to or higher than the editing right of the area in question, then the CPU 20 judges that the authentication has failed ("NG" at step S29).

At next step S30, the CPU 20 checks the user role information 35 of the logging-in user. If the right set in the user role information 35 of the logging-in user is equal to or higher than the "User", more specifically equal to or higher than the in-area-amplifier controlling right, it means that the logging-in user has a right to control the real device corresponding to the virtual device to be synchronized. Thus, in such a case, an "Editing Permitted" determination is made at step S30. Note that, whereas branching at step S30 has been described as effected on the basis of the user role information 35 of the logging-in user, it may be effected on the basis of one of the user role information 35 of the logging-in user and the user role information 35 of the same user in the acquired UserInfo information 45 which indicates a lower right than the other. In such a case, the right check based on the UserInfo information 45 is doubled in the PC 2 and amplifier, so that enhanced security can be achieved. Also, a later-described right determination to be made in the amplifier (step S61) can be dispensed with.

If, on the other hand, the right set in the user role information 35 of the logging-in user is lower than the "User", more specifically, if the user does not have the in-area amplifier controlling right (i.e., if the user has only the in-area amplifier browsing right), a "Unqualified for Editing" determination is made at step S30. Branching to the "Unqualified for Editing" route means permitting monitoring. In the instant embodiment, the determination operation of step S30 is arranged such that the "Unqualified for Editing" is made for all of the virtual devices in the area in question when a given virtual device having been subjected to the synchronization process first of all the virtual devices in the area has been set in the monitoring state as a result of the synchronization process (i.e., if the virtual device having been subjected to the synchronization process first has only an insufficient right, if the corresponding amplifier (real device) is already under control of another user, or if the "Get Editable" button 78 is currently in the OFF state, namely, if the user itself has selected to be in the monitoring state. This operation is based on the design policy that "devices in an area are controlled by a single PC".

Once the "Qualified for Editing" determination is made at step S30, the CPU 20 proceeds to step S31 in order to transmit, to the real device corresponding to the virtual device currently selected or set as the object of synchronization, a "control request" requesting permission of control, by the logging-in user, of the real device. At that time, the user ID and authentication information of the logging-in user too are transmitted to the real device along with the control request. Then, through a later-described process of FIG. 25, the real device having received the control request determines whether control, by the logging-in user, of that real device should be permitted or not and sends a result of the determination to the PC 2.

At appropriate timing after transmission of the control request at step S31 but before receipt of a response at step S32, the CPU 20 of the PC 2 transmits, to the real device, the area ID 46 of the area in question stored in the current project, controller ID 40 of the PC 2, group information 36 and user role information 35 included in the area information 33 which the virtual device to be synchronized belongs to, and user information (group of account information 34) stored in the current project. The controller ID 42, area ID 43, group information 44 and UserInfo information 45 of the real device are overwritten with these transmitted information.

Then, at step S32, the CPU 20 checks the response transmitted from the real device in response to the control request. The response from the real device is one of "qualified for controlling", "qualified for monitoring" and "reject". If the user has the right for controlling the real device and if the real device is not being controlled by any other user, the response from the real device is "qualified for controlling". If the user has the right for browsing the real device, or if the real device is being controlled by some other PC (other control master) 2 although the user has the right for browsing the real device, then the response from the real device is "qualified for monitoring". In other cases, e.g., if the user is an "Outside" having no right to the real device, or if the user has no account (user ID and authentication information) in that real device, the control request is determined to be improper or unfair, so that the "reject" response is transmitted from the real device to the PC 2.

If the response transmitted from the real device in response to the control request is "qualified for controlling" as determined at step S32, the CPU 20 goes to step S33, where "ON-LINE" is set as the On-Line status information 39 of the device information 37 corresponding to the amplifier selected or set as the object of synchronization and stored in the current project. The real device transmits, along with the "qualified for controlling" response, the controller ID 42 (i.e., controller ID of the control master of the real device) stored in the real device. Then, the CPU 20 of the PC 2 overwrites the controller ID 40, included in the device information 37 corresponding to the virtual device currently set as the object of synchronization and stored in the current project, with the controller ID 42 received along with the "qualified for controlling" response. If the response is "qualified for controlling" like this, the controller ID 42 of the real device is identical to the controller ID of the PC 2.

Further, if the device ID 38 of the virtual device and the device ID 41 of the real device match each other only in part (i.e., only in either MAC address or area ID) when "ON-LINE" has been set as the On-Line status information 39 at step S33, the CPU 20 also performs an operation for causing the device IDs of the virtual and real devices to match each other. If the device IDs of the virtual and real devices match each other only in MAC address, then the device ID 41 of the real device is overwritten with the device ID 38 of the virtual device. Further, if the device IDs of the virtual and real devices match each other only in area address, then the device ID 38 of the virtual device is overwritten with the device ID 41 of the real device. Also, at that time, the IP address and model type information (FIG. 4) of the virtual device are overwritten with the IP address and model type information of the real device.

At following step S34, the CPU 20 checks consistence, i.e. match/mismatch, between the operation data included in the device information 37 of the virtual device and the operation data stored in the memory 11 of the real device. If the two operation data match each other, the CPU 20 judges that no data synchronization process has to be performed between the virtual device and the real device ("OK" at step S35), and thus, the synchronization process on the virtual device is brought to an end.

If, on the other hand, the operation data of the virtual and real devices do not match each other ("NG" at step S35), the CPU 20 displays a "Synchronizing Direction Selection" screen of FIG. 19 on the display 24. On the "Synchronizing Direction Selection" screen, there are provided radio buttons 69 for the user to select, as a synchronizing direction, "Synchro" (Application→Device) or "Reverse Synchro" (Device→Application). In the illustrated example of FIG. 19, the "Synchro" direction is selected by the radio buttons 69. Further, a field 70 is provided below the radio buttons 69 for displaying the name of a amplifier for which a mismatch in operation data has been detected at step S35. In the illustrated example of FIG. 19, an amplifier name "Amp3" is displayed in the field 70. The user can select, as the synchronizing direction, either "Synchro" or "Reverse Synchro" using the corresponding radio button 69 and fix the synchronizing direction, selected by the radio button 69, by operating an "OK" button image 71. Namely, the "Go On-line" instruction for setting an amplifier (virtual device) includes a synchronizing-direction selection instruction as well.

At step S36, the CPU 20 performs an operation for synchronizing the data of the virtual and real devices in accordance with the synchronizing direction ("Synchro" or "Reverse Synchro") selected by the user on the synchronizing direction selection screen. When "Synchro" is the selected synchronizing direction, the CPU 20 overwrites the operation data of the virtual device onto the operation data of the real device via the network. Namely, data settings of the real device are caused to agree with data settings of the virtual device. When "Reverse Synchro" is the synchronizing direction, on the other hand, the CPU 20 receives the operation data of the real device via the network and overwrites the received operation data of the real device onto the operation data of the virtual device. Namely, the data settings of the current project are caused to agree with data settings of the real device.

If the "unqualified for Editing" determination has been made at step S30, the CPU 20 transmits a "monitor request" to the real device at a not-shown step, and then receives a response, "qualified for monitoring" or "reject", from the real device as in the case of the "control request". If the "qualified for monitoring" response has been received, or if the response has been determined at step S32 to be "qualified for monitoring", the CPU 20 branches to step S37, where "MONITOR" is set as the On-line status information 39 of the device information 37 stored in the current project and corresponding to the amplifier currently selected or set as the object of control. If the response from the real device is "qualified for monitoring", the real device transmits, to the PC 2, the control ID 42 (i.e., controller ID of the control master of the real device, namely, controller ID of another PC 2 than the PC 2 currently performing the synchronization process) stored in the real device, along with the "qualified for monitoring" response. In other words, the PC 2 receives, at step S32, the "qualified for monitoring" response and control ID 42 of the control master of the real device.

Then, at step S38, the CPU 20 performs a reverse synchro. operation for synchronizing the data of the virtual device and the data of the real device, to thereby cause the data of the virtual device and the data of the real device to agree with each other. Namely, when setting the amplifier (virtual device) in the monitoring state, the synchronization process is performed compulsorily in the reverse synchro. fashion. Here, of the stored content of the memory 11 of the real device (see FIG. 6), data other than the area ID 43 and UserInfo information 45 are transmitted to the PC 2, and the corresponding data in the current project are overwritten with the data transmitted from the real device. More specifically, the device ID 38, model type information, IP address, operation data and controller ID 40 included in the device information 47, and the group information 36 ("Rack Tree" information, "Feed Structure Tree" information and "User Defined Tree" information) included in the device information 37 are overwritten with the stored content of the memory 11 of the real device. Namely, the data settings of the current project are caused to agree with the data settings of the real device, so that the virtual device in question is set in the monitoring state (i.e., state qualified for monitoring the real device).

It should be noted that, as the reverse syncro operation is to be performed at step S38 (i.e., the virtual device is to be switched to the monitoring state), the device ID 38 in the device information 37 is overwritten with the device ID 41 of the real device. Namely, when a match has been established by the matching process with the device ID 38 of the virtual device and the device ID 41 of the real device match each other only in part (i.e., only in either one of MAC address and area ID), the device ID 38 in the device information 37 is overwritten with the device ID 41 at the time of the reverse syncro operation performed at step S38.

If the re-authentication has failed ("NG" at step S29), or it the response has been determined to as "reject" as determined at step S32, or if the response, from the real device, to the "monitor request" is "reject", the synchronization process on the virtual device in question is brought to an end. When the synchronization process on the virtual device in question is to be brought to an end, or when some error has occurred during the synchronization process of steps S26-S38, the CPU 20 displays a "Warning Dialog Screen" as shown FIG. 20, where a message, such as "Authentication Failed", informing the user of the error or warning is displayed. Note that, in some case, such as when a mismatch in authentication information has been determined at step S26, a "Password Input Screen" is displayed along with the "Warning Dialog Screen". If there has occurred an error despite of which the synchronization process can still continue to be performed, a "Continue" button image 74 for instructing continuation of the synchronization process and a "Skip" button image 75 for instructing termination of the process are displayed to inquire of the user whether or not to continue the synchronization process on the virtual device in question. If there has occurred an error which necessitate discontinuation of the synchronization process, such as a negative determination at step S29 or S32, the Continue" button image 74 and "Skip" button image 75 are not displayed; instead, an "OK" button image 75 for inquiring of the user whether or not to accept the warning message, and the synchronization process on the virtual device is brought to an end in response to operation of the "OK" button image 75.

After the synchronization process on the virtual device is completed through the operations at steps S26-S38, a determination is made, at step S39, as to whether there is another virtual device to be subjected to the synchronization process of steps S26-S38. In the aforementioned manner, the synchronization process is performed on all of virtual devices registered in one area and associated with real devices. Through such a synchronization process, a user's controlling right to each of the individual amplifiers is set on a first-come-first basis (namely, only up to a monitoring right is permitted and set if there is already another control master). It can be understood that a user's control right is set per amplifier, e.g. in view of the arrangement that the UserInfo information 45 is provided in each of the amplifiers 1. However, the remote controlling software employed in the instant embodiment is primarily designed to perform control on an area-by-area basis, in other words, to assign one control master to each area (i.e., control each area by means of one PC 2). Thus, a user having an area editing right should design the area in such a manner that one control master is assigned to the area. Note that, upon completion of the synchronization process of FIG. 18, "ON-LINE" is set as the "On-line" status information included in the area information 33 of the area for which the synchronization process has been performed. Setting "ON-LINE" as the "On-line" status information may be effected upon start of the synchronization process (e.g., in response to operation of the "Go On-line" instruction button image 68).

Figure 17:
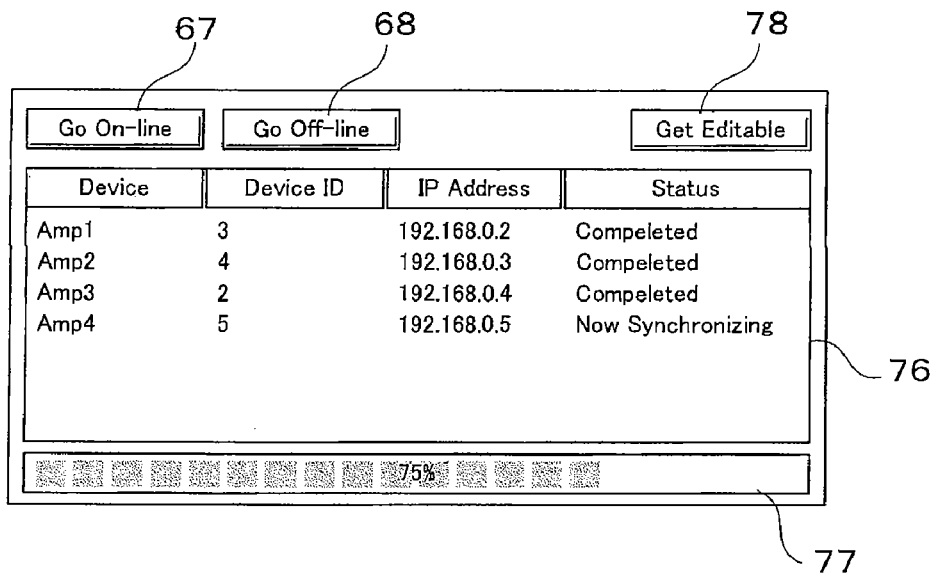
FIG. 17 is a diagram showing an example structure of a "Synchronized Dialog" screen displayed when an "On-Line" button image has been operated on the basic screen.

The "Synchronized Dialog" screen shown in FIG. 17 has a display section 76 for indicating a processing progression status. In the display section 76, there is displayed a list of virtual devices (i.e., virtual devices as synchronization candidates) that are located in an area to be subjected to the synchronization process and that have been associated with real devices. More specifically, the list includes the names, in-area IDs, IP addresses and On-line status information of the individual amplifiers (virtual devices). In the illustrated example, the amplifiers are listed on the list in order of the amplifier names. Initial value of the On-line status information of each of the amplifiers is one of "ON-LINE", "MONITOR" and "OFFLINE", depending on the value stored as the On-line status information of the amplifier. Once the synchronization process on one amplifier is started, "Now Synchronizing" is displayed in a status information field corresponding to an amplifier being subjected to the synchronization process. "Completed" is displayed in the status information field corresponding to each amplifier for which the synchronization process has been completed. FIG. 17 shows a state where the synchronization process has progressed partway through the area in question; namely, in the illustrated example, the synchronization process has been completed for "Amp1", "Amp2" and "Amp3", and "Amp4" is currently being subjected to the synchronization process. Meter 77 is provided below the display section 76 for indicating in percentage a synchronization process progression status in the entire area. In a case where the area, currently selected or set as the object of the synchronization process, includes an interface device ("ACD(1)" or "ACD(2)" in Area (1) of FIG. 7), such an interface device may also be listed in the display section 76.

After a given virtual device is set, through the synchronization process of FIG. 18, in the ONL-INE state with respect to a corresponding real device, and once operation for editing the operation data of the virtual device is performed in the PC 2 through the conventionally-known remote control function performed by the PC 2, the editing operation is transmitted to the corresponding real device via the network, so that the operation data of the corresponding real device are edited. Further, a result of the editing is transmitted to the PC 2 via the network, so that the result of the editing is reflected in the operation data of the virtual device (device information 37) in the current project. Further, data of indicative of various operating states detected in the real device (e.g., temperature at the output stage, input and output signal levels, supply voltage, output voltage, output current, load impedance, protection state, etc.) are transmitted from the real device to the PC 2, so that these operating states are displayed in the level display section 52, state display section 53, etc. as necessary.

Further, once a given virtual device is set, through the synchronization process of FIG. 18, in the monitoring (MONITOR) state with respect to a corresponding real device, the virtual device is displayed in a group tree of the tree display section 50 as an in-group device based on the group information 44 received from the real device through the reverse syncro operation of step S38 above. Then, once the operation data, group information 44 or the like of the real device is edited through the conventionally-known remote control function performed by the PC 2 in the above condition, the content of the editing is reflected in the operation data, group information 36, or the like of the virtual device (device information 37) in the current project of the PC 2. Further, data indicative of various operating states detected in the real device are transmitted from the real device to the PC 2, so that these operating states are displayed in the level display section 52, state display section 53, etc. as necessary.

Once the user operates the "Go Off-line" instruction button image 68 on the "Synchronized Dialog" screen shown in FIG. 17, the CPU 20 performs an off-line process for setting, in the off-line state, a real device associated with a given virtual device which are among the virtual devices registered in the area currently set as the object of the synchronization process and whose status information 39 is "ON-LINE" or "MONITOR". FIG. 21 is a flow chart showing an example operational sequence of the off-line process performed by the CPU 20 in response to operation, by the user, of the "Go Off-line" instruction button image 68.

At step S40 of FIG. 21, the CPU 20 transmits a "release" request to each real device associated with a given virtual device which is among the virtual devices registered in the area and whose On-Line status information 39 is "ON-LINE" or "MONITOR". Of such real devices having received the "release" request, each real device, which has so far been remote-controlled by the PC 2 that is a transmission source of the "release" request, performs a later-described operation for releasing itself from the remote control. In the read device having performed the "release" operation, the controller ID is set at "Null", and the UserInfo information 45 is cleared; namely, such a read device is set in a free state where it is not subjected to remote control by the user. Then, at step S41, the CPU 20 sets "OFF-LINE" as each of the On-Line status information of the area in the current project and the On-Line status information of each of the virtual devices. Thus, the area which was in the on-line state before the GO OFF-LINE instruction and all of the virtual devices in the area which were in the on-line or monitoring state are set in the off-line state.

Figure 22:
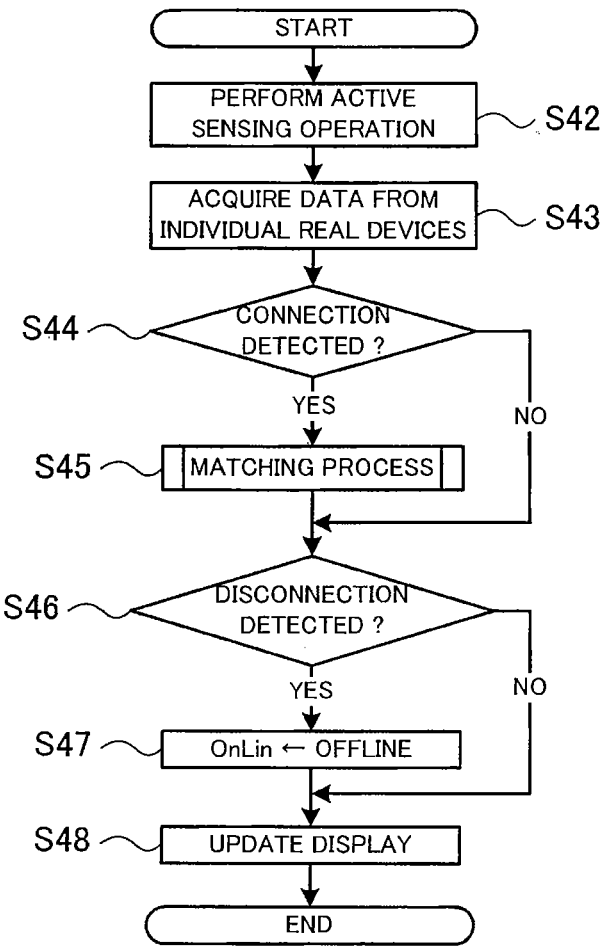
FIG. 22 is a flow chart showing an example operational sequence of a timer process performed by the personal computer at predetermined time intervals.

FIG. 22 is a flow chart showing an example operational sequence of a timer process performed by the CPU 20 of the PC 2 at predetermined time intervals. At step S42, the CPU 20 performs an active sensing operation for periodically checking whether an amplifier (real device) in the on-line state in the project is currently connected to the network. This active sensing operation is performed only when a real device associated with a virtual device whose On-Line status information 39 is "ON-LINE" or "MONITOR" has not been operated or has not sent any request (i.e., has not transmitted any data) for more than a predetermined time.

At step S43, the CPU 20 acquires, from a not-shown reception history buffer, various data received from the individual real devices after last execution of the timer process. The "various data" include a "connection" message generated by a real device at the time of connection to the network, a "setting change" message generated by a real device at the time of a setting change in the real device, and a "no-response" message indicating that no response has been made for a predetermined time from a corresponding real device that is in the on-line state. The "no-response" state means that the real device has been physically disconnected from the network, or that the real device has been powered off. The "no-response" state can be checked by the active sensing operation. In the case of "no-response", the CPU 20 in the instant routine determined that the real device has been physically disconnected from the network.

Once a "connection" message is acquired at step S43, i.e. once connection of a new real device is detected (YES determination at step S44), the CPU 20 performs, at step S45, the matching process with a view to associating the new real device, whose connection has been detected, with a virtual device.

Once a "no-response" message is acquired at step S43, i.e. once disconnection of a real device is detected (YES determination at step S46), the CPU 20 changes the On-Line status information 39 of the virtual device, corresponding to the real device whose disconnection has been detected, to "OFF-LINE".

At next step S48, the CPU 20 updates the display of the tree display section on the basic screen in accordance with the result of the operation at step S46 or S47. If there is a virtual device that could be successfully associated, through the matching process, with the real device having been connected to the network, the visual representation corresponding to the virtual device is switched from the real-device-absent indicating display style (dotted line) to the real-device-present indicating display style (solid line). If, on the other hand, there is no virtual device that could be successfully associated, through the matching process, with the real device having been connected to the network, a virtual device corresponding to that real device is created and displayed in the "Unknown Device" category. Further, for the virtual device whose On-Line status information 39 has been changed to "OFF-LINE" at step S47 (i.e. which corresponds to the disconnected real device), the visual representation corresponding to the virtual device is switched from the real-device-present indicating display style (solid line) to the real-device-absent indicating display style (dotted line). Note that, when a real device corresponding an outside-area virtual device has been disconnected, the corresponding visual representation (categorized in the "Unknown Device" category) is displayed in the real-device-absent indicating display style (dotted line) instead of being erased. Such a virtual device left displayed in the "Unknown Device" category in the real-device-absent indicating display style will prove useful because it can be used for off-line editing of the device tree. User having a right equal to or higher than the Power User in a given area can move the virtual device from the "Unknown Device" category to that area. If such movement is effected, the moved virtual device is assigned an in-area ID, and the corresponding device information 37 is stored into the area information 33 of the area.

The flow chart of FIG. 22 shows only operations performed when a real device has been connected or disconnected. Note, however, that, when another message, such as a "setting change" message indicative of a setting change in a real device, the CPU 20 performs operations corresponding to the acquired message as necessary.

Figure 23:
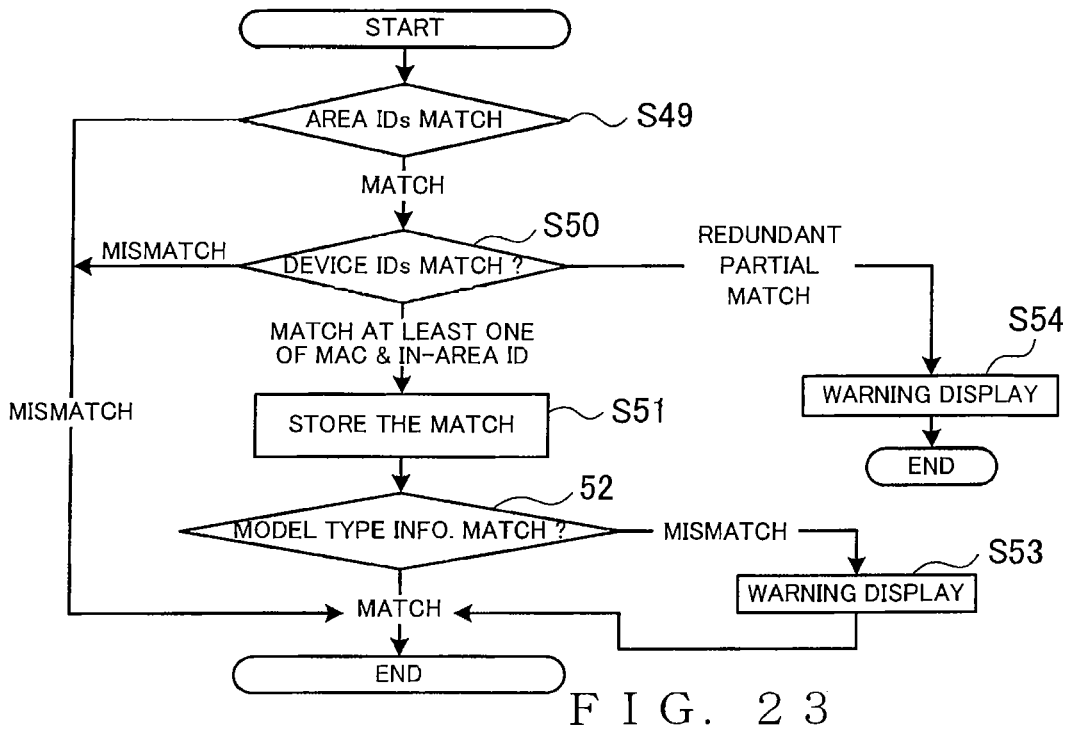
FIG. 23 is a flow chart showing an example operational sequence of a process performed by the personal computer for matching virtual and real devices.

FIG. 23 is a flow chart showing an example operational sequence of the matching process performed by the CPU 20 at step S8 of FIG. 11, step S12 of FIG. 13, or step S45 of FIG. 22. Step S45 of FIG. 22 shows the matching process performed on one amplifier. The PC 2 detects real devices (amplifiers) currently connected to the network and performs the matching process of FIG. 23 for each of the detected real devices.

At step S49, the CPU 20 acquires the area ID 43 of a real device currently designated as the object of matching (hereinafter referred to also as "to-be-matched real device") and collates the acquired ID 43 of the real device with the IDs 46 of the individual areas stored in the current project, to thereby identify an area which the real device to be matched belongs to. If the acquired area ID 43 of the real device has matched any one of the IDs 46 of the areas ("match" at step S49), the CPU 20 goes to step S50 in order to collate the acquired device ID 41 of the real device with the device IDs 38 of the individual device information 37 in the area identified at step S49 above (i.e., the area of the area ID which the ID 43 of the real device has matched). If, on the other hand, If the area ID 43 of the real device has matched none of the area IDs 46 of the areas ("mismatch" at step S50), the matching process on the amplifier is brought to an end.

As noted above, the device ID comprises a MAC address and an in-area ID. If the device ID 41 of the real device has matched any one of the device IDs 38 in at least one of MAC address and in-area ID as determined by the device ID collation operation of step S50, the CPU 20 determines that the device ID 41 stored in the real device has matched one of the devices ID 38 of the virtual device information 37. In the instant embodiment, the device ID collation at step S50 is arranged such that the device ID matching is performed on the basis of the in-area IDs if the ID matching based on the MAC addresses has failed. The ID matching based on the MAC addresses would fail if there is no match in MAC address or if no MAC address is included in the device ID of the virtual device (device information 37).

If the device ID 41 of the real device has matched any one of the device IDs 38 in at least one of MAC address and in-area ID ("matched in at least one of MAC address and in-area ID" at step S50), the CPU 20 stores the match (in device ID and area ID) between the real device and the virtual device. Even if the device ID 41 of the real device has matched any one of the device IDs 38 only in one of MAC address and in-area ID (partial match in device ID), the operation for causing the device ID 38 of the virtual device and the device ID 41 of the real device to agree with (or match) each other (i.e., overwriting of the device ID) is not performed here. Namely, a partial match in device ID is left uncorrected for the moment, because the operation for causing the device ID 38 of the virtual device and the device ID 41 of the real device to agree with (or match) each other (i.e., overwriting of the device ID) is performed in the synchronization process shown in FIG. 18. Once a match between the real device and the virtual device is confirmed, the visual representation, in each tree, of the virtual device that has been successfully associated with the real device is switched from the real-device-absent indicating display style (dotted line) to the real-device-present indicating display style (solid line).

At following step S52, the CPU 20 collates the model type information stored in the real device with the model type information of the virtual device (device information 37) having matched the device ID 41 of the real device at step S50. If there has been found a match between the two collated model type information, then the matching process on the amplifier in question is brought to an end. In this way, the real device set as the object of matching and the corresponding virtual device can be associated with each other. If, on the other hand, there has been found no match between the two collated model type information ("Mismatch" at step S52), the CPU 20 branches to step S53 to make a warning display on the display for informing the user that the model type information stored in the real device and the model type information of the virtual device (device information 37) has failed to match each other, and then ends the matching process on the amplifier in question. Namely, even if the two model type information has failed to match each other, the CPU 20 causes association between the virtual device and the real device to be established; in this case, the thus-associated virtual device can not be set in the on-line state by the synchronization process, but can be set in the monitoring state by the synchronization process.

If the two collated device IDs do not match each other in both MAC address and in-area address ("Mismatch" at step S50), then the matching process on the amplifier is brought to an end. Further, if the real device redundantly matches more than one virtual device in part of device ID ("Redundant Partial Match" at step S50), the CPU 20 makes a warning display on the display for informing the user of the redundant partial match with more than one virtual device, after which the matching process on the real device is brought to an end. To avoid such a redundant match, each virtual device having already been associated with a real device is better excluded from objects of the matching process of FIG. 23.

The matching process of FIG. 23 can automatically perform the matching-based association between real devices connected to the network and virtual devices registered in areas of the current project. The matching process is achieved by the matching of step S49 based on (or using) the area IDs and the matching of step S50 based on the device IDs (i.e., based on at least one of the MAC addresses and in-area IDs). Thus, in a case where a given project file previously used in a sound system is used in a sound system identical in construction to the previous sound system, area IDs, MAC addresses, etc. assigned to virtual devices in individual areas in the project can match area IDs, MAC addresses, etc. assigned to individual real devices in the sound system; as a consequence, automatic association can be performed between the virtual devices in the individual areas in the project and the real devices in the sound system. Further, even when part or all of the real devices are replaced with other real devices of the same types, automatic association can be achieved similarly to the above-described as long as the same area IDs and in-area IDs are set in the other real devices. In the instant embodiment, the user can input such area IDs and in-area IDs using the operation panel 15 of the operation panel 15 of the amplifier 1.

When the logging-in user has a right equal to or higher than the "Power User" (e.g., area editing right), the arrangement of the matching process is modified as follows. Namely, prior to the collation of step S49 between the ID 43 of the real device and the IDs 46 of the individual areas stored in the current project, the CPU 20 performs the operation of step S50 for performing MAC address matching between the device ID 41 of the real device with the device IDs 38 of the individual device information 37. If no MAC address match has been found, the CPU 20 performs further matching in area ID and in-area ID between the device ID 41 of the real device and the device IDs 38 of the individual device information 37. In this way, the automatic matching and association can be performed with an increased flexibility. For example, when a given project file using given real devices is to be closed to open another project file using the same real devices, the devices in the other project file can be used for the matching in stead of the devices having so far been set in the on-line state in the given project file.

In the instant embodiment, the user can input an area ID and in-area ID using the operation panel 15 of the amplifier 1, which is, however, only for the above-described automatic matching purpose. When the area ID and in-area ID of an amplifier 1 in the on-line state is changed via the operation panel, the change could cause a significant error in the entire system. Thus, while the real device (amplifier 1) is in the off-line state, the real device is locked to prevent the area ID and in-area ID from being changed via the operation panel 15. Similarly, while the PC 2 is in the off-line state, the PC 2 is locked to prevent the area ID of each area in the on-line state and the in-area ID of each virtual device in the on-line state from being changed.

Further, the matching processing using (or based on) only the in-area IDs is permitted in the instant embodiment, as set forth above. Thus, when a given real device, such as one having become malfunctioning, has been replaced with another real device, for example, the instant embodiment allows the matching process on the other real device to be performed with ease. Namely, the other real device (i.e., replacing real device) can be readily associated with the same virtual device that was previously associated with the given real device (i.e., replaced real device), by only assigning the replacing real device the same in-area ID as assigned to the replaced real device, disconnecting the replaced real device from the network, connecting the replacing real device to the network and then performing the matching process on the replacing real device. As a consequence, operation for replacing a given amplifier 1 in the sound system, etc. can be performed with ease.

According to the matching process of FIG. 23, where automatic association between real and virtual devices is performed using their respective area IDs and device IDs, a match can be established only when not only the real device having a device ID 41 agreeing with the device ID 38 of a virtual device registered in any one of the areas (i.e., the real device corresponding to the virtual device) is connected to the network but also the area ID 43 of the real device matches the area ID 46 of the area having the virtual device registered therein, namely only when the real device belongs to any one of the areas in the current project. Further, only when a virtual device in the area could be successfully associated with a real device through the matching process, the PC 2 can synchronize the real device through the synchronization process of FIG. 17, and control or monitor the real device. Thus, while a given PC 2 is monitoring a real device in a given area (i.e., there is another control master for each real device in that area), and if a real device has been newly added to that area via the current project of the other control master, the newly added real device can not be monitored by the PC 2 unless a virtual device corresponding to the newly added real device is registered in an area of the current project currently activated in the given PC 2. In this case, only a portion (or some) of real devices in the same area can be monitored by the PC 2.

Even when a real device has been detected, association of the real device can not be performed successfully unless there is no corresponding virtual device registered in an area of the current project (i.e., if a "mismatch" determination is made at step S49 or at step S50). In this case, a visual representation indicative of an "outside-area virtual device" is displayed in the device tree of the tree display section 50, as noted above. Each real device corresponding to a virtual device erased from a given area or moved to another area in the current project is determined, in the matching process of FIG. 23, to be an "outside-area virtual device" due to a mismatch in area ID. In this case, no match is achieved between the virtual device and the real device, so that the PC 2 can neither control nor monitor the real device. User having a right equal to or higher than the "Power User" in a given area can move an outside-area virtual device to that area while the area is in the off-line state. Once the area is then switched to the on-line state, the virtual device is assigned an in-area ID in that area, and the corresponding real device is subjected to settings as a real device in that area.

The virtual and real devices have stored therein respective group information 36, 44. These devices can be grouped within an area, and the group information is used in the matching process to perform automatic association between virtual and real devices. Thus, even when a given virtual device has been moved from one group to another in the same area (namely, the group information 36 and group information has become no longer matching each other), the virtual and real device can be associated with each other because the two devices still match each other in area ID and device ID. Even if the group information 36 included in the area information of a given area in the current project of the PC 2 and the group information 44 stored in a given real device does not match each other when the given real device is to be monitored by the PC 2, the virtual device and the real device can be associated with each other on the basis of the area and device IDs, and the group information 36 is overwritten with the group information 44 stored in the given real device. Thus, even when the real device has been moved to another group in the same area, the monitoring PC 2 can automatically recognize, and monitor the operation data of, the real device as a device belonging to the moved-to group.

Whereas the instant embodiment has been described as performing the matching using the area IDs when the association between virtual and real devices could not be successfully achieved using the MAC addresses in the device ID collation process of step S50 above, the matching may be performed using the in-area IDs only if the device ID 38 of the PC 2 (device information 37) does not have a MAC address stored therein. In the case where step S50 is arranged like this, a mismatch in MAC address is considered as a mismatch in device ID.

FIG. 24 is a flow chart outlining a general operational sequence performed by the CPU 10 of the amplifier (real device) 1. Operations to be described here concern control of the amplifier 1 that is performed by a control program executed by the CPU 10, but not sound signal processing (performed by the DSP 13 and power amplification section 14). The flowcharted operational sequence of FIG. 24 is started up upon powering-on of the amplifier 1. First, at step S55, the CPU 10 performs a predetermined initialization process, which includes setting of an IP address, broadcasting of a "connection" message informing of connection, to the network, of the amplifier 1, etc.

Once any command is received from any one of the PCs 2 ("YES" at step S56), the CPU 10 goes to step S57 to perform a process corresponding to the received command as will be detailed later. Further, once the user operates an operating member of the operation panel (user interface 15) of the amplifier 1 ("YES" at step S58), the CPU 10 proceeds to step S59 to perform a process corresponding to the operation performed on the operation panel. Examples of such operation on the operation panel include setting of an in-area ID etc. Specifically, the in-area ID setting operation comprises inputting a numerical value. Once such in-area ID setting operation is performed, the CPU 10 stores the input value into the memory 11 of the amplifier (real device) 1 as an in-area ID of the amplifier 1. The operations of steps S56-S59 are repeated until the amplifier 1 is powered off.

FIG. 25 is a flow chart showing an example operational sequence of a process performed by the CPU 10 at step S57 above when a "control request" has been received from the PC 2 at step S31 of FIG. 18. At step S60, the CPU 10 makes a comparison between the UserInfo information 45 stored in the memory 11 of the amplifier 1 and the user ID and account information 34 of a user having transmitted the "control request" (i.e., user currently logging in to the current project, or logging-in user), to thereby perform authentication of the user. In the user authentication, the CPU 10 determines whether the account information (user ID and authentication information) 34 of the user having transmitted the "control request" is included in the UserInfo information 45 stored in the memory 11 of the amplifier 1, and, if so, checks a right(s) given to that account in order to determine whether the user in question has a right to control the amplifier 1. If the UserInfo information 45 has already been cleared, the CPU 10 judges that the user has the right to control the amplifier 1 irrespective of the account information 34 of the user ("OK" at step S61).

If the account information 34 of the user having transmitted the "control request" is included in the UserInfo information 45 and the user has been judged to have the right to control the amplifier 1, the CPU 10 determines that authentication of the user has been established ("OK" at step S61). Then, at step S62, the CPU 10 determines whether the controller ID 42 stored in the memory 11 of the amplifier 1 has a value recorded therein, indicative of an ID of a control master, included therein, to thereby determine whether the amplifier 1 in question is being currently remote-controlled by another PC 2 than the PC 2 having made the control request. If the controller ID 42 has recorded therein a value indicative of an ID of a control master, the CPU 10 of the amplifier 1 determines that there is a control master (another PC) already remote-controlling the amplifier 1 ("Control master ID Included" at step S62). In that case, or if the right indicated by the corresponding user role in the UserInfo information 45 is just the browsing right (i.e, if the right of the user is insufficient) although the account information 34 of the user having transmitted the "control request" is included in the UserInfo information 45, then the CPU 10 goes to step S63 in order to transmit, to the PC 2 having transmitted the "control request", a "Monitoring Permitted" response informing that the PC 2 now has a permission to monitor the amplifier 1. After that, the CPU 10 does not accept any subsequent control request. In other words, the right to control the amplifier 1 is acquirable on the first-come-first-served basis. When transmitting the above-mentioned "Monitoring Permitted" response, the CPU 10 transmits, along with the response, a value currently set as the controller ID (i.e., controller ID of the control master already remote-controlling the amplifier 1). In this way, the controller ID of the other PC 2 already remote-controlling the amplifier 1 is informed to the PC 2 of the user. Note that agreement between the controller ID of the PC 2 and the controller ID included in the controller ID 42 may also be taken into account in the determination of step S62. Namely, a "Null" determination may be made at step S62 not only when no value indicative of a controller ID is included in the controller ID 42, but also when the controller ID included in the controller ID 42 agrees with the controller ID of the PC 2.

If no value is set in the controller ID 42 stored in the memory 11 of the amplifier 1 ("Null" at step S62), it means there is no controlling mater (other PC) currently remote-controlling the amplifier 1. Thus, the CPU 10 of the amplifier 1 determines that the amplifier 1 is not currently being remote-controlled by any PC. In this case, the CPU 10 goes to step S64 to acquire, from the PC 2 having transmitted the "control request" (i.e., new control master), the controller ID of the PC 2, area ID of the area where the virtual device associated with the amplifier (real device) 1 is registered in the current project, and group information ("Rack Tree", "Feed Structure Tree" and "User Defined Tree") (node or group position information) 36 of the area and then updates the controller ID 42, area ID 43 and group information ("Rack Tree", "Feed Structure Tree" and "User Defined Tree") 44, stored in the memory 11 of the amplifier 1, on the basis of the thus-acquired IDs and information.

Further, at step S65, the CPU 10 acquires, from the PC (new control master) 2, the user information (account information 34 of all users) stored in the current project of the PC 2 and the user role information 35 included in the area where the virtual device associated with the amplifier (real device) 1 is registered in the current project, and then updates the UserInfo information 45, stored in the memory 11 of the amplifier 1, on the basis of the thus-acquired account information 34 and user role information 35. In this way, the amplifier 1 can have the same account information and user role information of the individual users as the account information and user role information set in the currently-opened current project of the PC 2 that is now the control master of the amplifier 1.

Then, at step S66, the CPU 10 transmits, to the PC 2 having transmitted the "control request", a "Control Permitted" response informing that the PC 2 now has a permission to control the amplifier 1. At that time, the CPU 10 transmits, to the PC 2, the value of the controller ID, updated at step S65, along with the "Control Permitted" response. This controller ID is of the PC 2 to which the controller ID is transmitted. Then, on the basis of the "Control Permitted" response transmitted to the PC 2 at step S66 or the "Monitoring Permitted" response transmitted to the PC 2 at step S63, the CPU 20 of the PC 2 makes the determination at step S31 of the synchronization process shown in FIG. 18, as set forth above.

If, in the user authentication at step S60 above, no account of the user having made the "control request" is in the UserInfo information 45 stored in the amplifier 1, the CPU 10 of the amplifier 1 determines that the user authentication has failed ("NG" at step S61), and then it branches to step S67 to transmit, to the PC 2 having transmitted to the "control request", a "Reject" response informing of rejection of the control request. Note that agreement of the area ID of the real device with the area ID of the corresponding virtual device in the PC 2 may also be taken into consideration in the user authentication of step S60. Namely, an "NG" determination may be made at step S61 not only when the account information 34 of the user, having made the control request, is not included in the UserInfo information 45 of the real device2, but also when the area ID of the corresponding virtual device acquired from the PC 2 and the area ID of the real device do not agree with each other.

Figure 26:
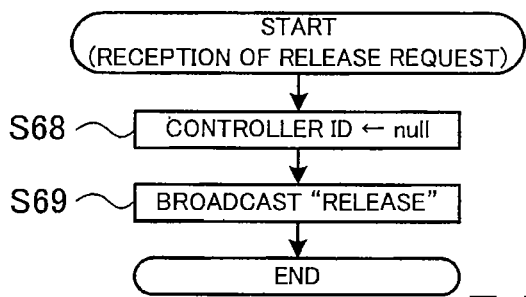
FIG. 26 is a flow chart showing an example operational sequence of a process performed by the amplifier when a release request has been received from the personal computer.

FIG. 26 is a flow chart showing an example operational sequence of a process performed by the CPU 10 at step S57 above when a "release request" has been received from the PC 2 at step S40 of FIG. 21. At step S68, the CPU 10 sets the controller ID 42 of the amplifier 1, which it belongs to, at "Null" and clears the UserInfo information 45. Thus, the amplifier 1 is set in a free state where it is not subjected to remote control by any of the users (PCs 2). At next step S69, the CPU 10 broadcast, to the network, a message informing that the amplifier 1 it belongs to has been released from remote control.

Figure 27:
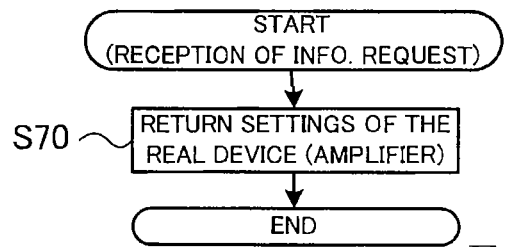
FIG. 27 is a flow chart showing an example operational sequence of a process performed by the amplifier when an information supply request has been received from the personal computer.

FIG. 27 is a flow chart showing an example operational sequence of a process performed by the CPU 10 at step S57 above when the CPU 10 has been requested by the PC 2 to supply information about various data settings, operating states, etc, of the amplifier 1. At step S70, the CPU 10 returns information about various data settings, operating states, etc, of the amplifier 1, requested by the PC 2, to the PC 2. The information returned to the PC 2 at step S70 includes, for example, the model type information of the amplifier 1, values of the operation data, input and output levels of sound signals of the amplifier 1, temperature level of the amplification section 14, etc., and it is part of the data stored in the memory 11 of the amplifier 1. Note that information about the operating states of the amplifier 1 etc. mat be supplied periodically to the PC 2 currently controlling or monitoring the amplifier 1. Namely, the process of FIG. 27 for supplying information to the PC 2 and the like may be performed even when no particular command is received from the PC 2. Further, the process of FIG. 27 may be performed on the condition that the account information 34 of the user having requested the information is included in the UserInfo information 45 and the right indicated by the user role included in the UserInfo information 45 is equal to or higher than the browsing right. In this case, a check is made on the user's right in a dual manner in the amplifier 1 and in the PC 2.

Figure 14:
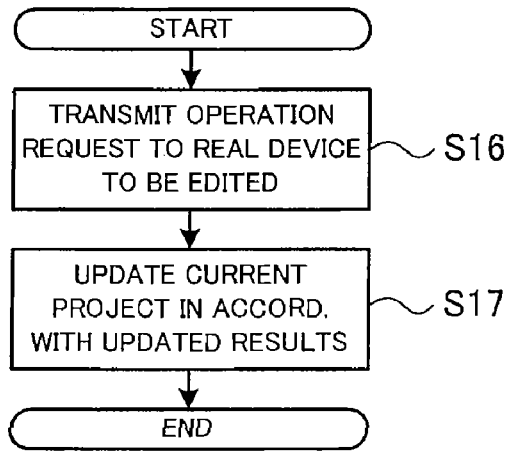
FIG. 14 is a flow chart showing an operational sequence of a process performed by the personal computer when an amplifier (virtual device) has been edited on the basic screen while the amplifier is in an on-line state.
Figure 28:
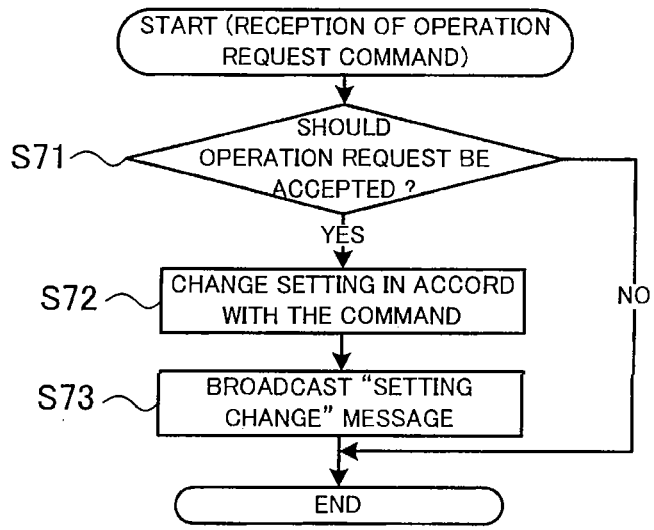
FIG. 28 is a flow chart showing an example operational sequence of a process performed by the amplifier when an operation request has been received from the personal computer.

FIG. 28 is a flow chart showing an example operational sequence of a process performed by the CPU 10 at step S57 above when an "operation request" has been received from the PC 2 at step S15 of FIG. 14. At step S71, the CPU 10 determines whether or not to accept the operation request having been made by the PC 2. The CPU 10 determines, at step S71, that the operation request should be accepted, when the controller ID of the PC 2 having made the operation request and the controller ID 42 stored in the memory 11 of the amplifier 1 (i.e., controller ID of a control master) match each other, i.e. when the PC 2 having made the operation request is the control master of the amplifier 1 in question. On the other hand, the CPU 10 determines, at step S71, that the operation request should not be accepted, at least one of: when the controller ID of the PC 2 having made the operation request and the controller ID 42 stored in the memory 11 of the amplifier 1 do not match each other; when another PC 2 than the PC 2 having made the operation request is the control master of the amplifier 1; and when the user currently logging in to the PC 2 having made the operation request has only an insufficient right. If it has been determined that the operation request should not be accepted ("NG" at step S71), the process of FIG. 28 is brought to an end. That the controller ID of the PC 2 having made the operation request matches the controller ID 42 stored in the memory 11 of the amplifier 1 means that the logging-in user has the right to control the area in question as determined at step S30 of FIG. 18 and the controller ID of the PC 2 has been written into the memory 11, and thus it means that a dual check on the user's right is effected in conjunction with the operation of step S71.

Once the operation request is accepted ("OK" at step S71), the CPU 10 goes to step S72 to update the data stored in the memory 11 in accordance with the command (content of the operation) transmitted from the PC 2. Then, at step S73, the CPU 10 broadcasts updated data settings (setting change message) to the network. The reason why the updated data settings (setting change message) are broadcast to the entire network as well as the control-master PC 2 is to send the setting change message to other users (i.e., PCs 2 other than the control master) authorized to only monitor the amplifier. In this way, the updated data settings are reflected in all PCs (i.e., control-master PC 2 and other PCs) having received the setting change message.

Figure 29:
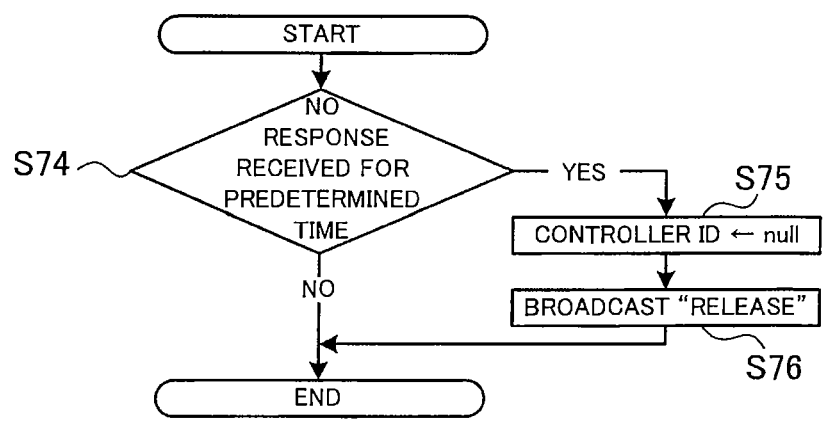
FIG. 29 is a flow chart showing an example operational sequence of a timer process performed by the amplifier.

FIG. 29 is a flow chart showing an example operational sequence of a timer process performed by the CPU 10 of the amplifier 1 at predetermined time intervals. At step S74, the CPU 20 performs an active sensing operation on all of the PCs 2 on the network. If no response has been received form the PCs 2 on the network for a predetermined time period ("YES" at step S74), the CPU 10 goes to step S75 to set the controller ID 42 of the amplifier 1, which it belongs to, at "Null" and clear the UserInfo information 45. Thus, the CPU 10 of the amplifier 1 is set in the free state where it is not subjected to remote control by any of the users (PCs 2). At next step S75, the CPU 10 broadcast, to the network, a "release" message informing that the amplifier 1 it belongs to has been released from remote control.

If a "Power User" having the right to edit the area, which the amplifier 1 belongs to, is in a log-on (log-in) state in a PC 2 having received the "release" message broadcast at step S75, the CPU 20 of the PC 2 performs the synchronization process of FIG. 18 to set the amplifier 1, having transmitted the above-mentioned release message, in the on-line state. Here, the synchronization process, starting at step S26 of FIG. 18, may be performed either on only the amplifier 1 having transmitted the above-mentioned release message, or on all amplifiers registered in the area in question.

The synchronization process of FIG. 18 has been described above transmitting, to the amplifier 1, the controller ID, area ID, group information, user information and user role information during a period from the transmission of the control request at step S31 to the receipt of the response at step S32. Alternatively, the transmission, from the PC 2, the above-mentioned information may be effected at any suitable timing during step S31-step S33 (directed to setting of the On-Line status) as long as the "control permitted" response transmission at step S66 is performed prior to the information updating at steps S64 and S65.

Further, the instant embodiment has been described as arranged to always transmit, from the PC 2 to the real device, the controller ID 40, area ID 46, group information 36, account information 34 and user role information 35 during a period from the transmission of the control request at step S31 to the receipt of the response at step S32. However, "over-writing", with the above-mentioned transmitted information, of the information stored in the real device is effected only when the "control permitted" response has been received at step S32, and data transfer on the network in other cases is wasteful. Thus, to avoid such wasteful data transfer, the above-mentioned information may be transmitted from the PC 2 to the real device, at timing following step S32, only when the "control permitted" determination has been made. In such a case, the processing order of steps S64 to S66 of FIG. 25 has to be adjusted such that step S66 is performed first, then step S64 and then step S65.

Further, whereas, in the above-described embodiment, the user-right check is performed at a plurality of stages in a dual manner in an amplifier and in a PC, such a user-right check may be performed in only one of an amplifier and PC.

Furthermore, whereas the device ID 38, 41 employed in the instant embodiment has been described as comprising a MAC address and in-area ID of the amplifier 1, it is not limited to the described structure as long as it comprises a combination of some ID information (preferably, fixed ID information) uniquely identifying the amplifier in question and an in-area ID.

Furthermore, whereas the preferred embodiment has been described in relation to the case where the basic principles of the present invention are applied to the sound system where the power amplifier devices 1 and the personal computers 2 for controlling the power amplifier devices 1 are connected via the network, the construction of the sound system is not so limited, and the basic principles of the present invention may be applied to any sound systems where audio devices, such as audio mixers and recorders other than power amplifier devices, and at least one control device are connected via a network.

Furthermore, whereas the remote controlling software employed in the preferred embodiment has been described as capable of creating a plurality of areas, only one pre-set area may be used, and the remote controlling software may be one incapable of creating a new area.

Furthermore, a user may be allowed to set desired display styles, such as icon shapes, display fonts and/or display colors, of visual representations (virtual devices) indicative of areas, groups, group structures (trees) and amplifiers in the tree display section 50, and display styles of visual representations indicative of areas, groups, group structures (trees) and amplifiers, presented in a PC monitoring the sound system, may be made to agree with the display styles in the PC controlling the amplifier selected or set as an object of monitoring.

Because, as set forth above, any user having no account in the UserInfo information 45 stored in a desired amplifier 1 and/or having only an insufficient right recorded in the UserInfo information 45, is not permitted to control or monitor the amplifier 1 via the PC 2, the above-described embodiment of the invention can effectively prevent the amplifier 1 from being controlled or monitored by any unauthorized user, to thereby protect all amplifiers on the network.

This application is based on, and claims priority to, JP PA 2008-061481 filed on 11 Mar. 2008, JP PA 2008-061479 filed on 11 Mar. 2008 AND JP PA 2008-061480 filed on 11 Mar. 2008. The disclosure of the priority applications, in its entirety, including the drawings, claims, and the specification thereof, is incorporated herein by reference.

What is claimed is:

1. A sound system including a network having connected thereto a plurality of audio devices and at least one control device for controlling the plurality of audio devices, each of said plurality of audio devices including a first storage section storing therein an audio device ID identifying the audio device, control data for controlling the audio device, and an area ID indicative of an area the audio device belongs to, the audio device ID being composed of an unique ID and an in-area ID, the in-area ID and area ID being set by a user, said control device comprising:

a second storage section storing therein one piece of area information including an area ID indicative of an area and one or more pieces of virtual device information for one or more virtual devices registered in the area, each of the virtual device information including a virtual device ID identifying the corresponding virtual device, and control data for remotely controlling an audio device related to the corresponding virtual device;

a matching section that receives, from each of the audio devices connected via the network, the audio device ID and the area ID in said first storage section of the audio device and judges, for each of the audio devices, if the audio device ID and the area ID from the audio device match any of the virtual device IDs and the area ID in said second storage section or not and, if the judgment is affirmative, relates the audio device with the virtual device identified by the matched virtual device ID and the area ID;

a synchronization section that synchronizes the control data for the virtual devices with the control data in the audio devices, by receiving, for each of the virtual devices, the control data from the audio device related with the virtual device and overwriting the control data for the virtual device in said second storage section with the received control data, or by transmitting, for each of the virtual device, the control data for the virtual device in said second storage section to the audio device related with the virtual device to over-
write the control data in the audio device with the transmitted control data; and a remote control section that remotely controls each of the audio device if the control data in the audio device is synchronized with the control data for one virtual device in said second storage section at the moment, by displaying the control data for the virtual device in said second storage section for the user, receiving a control operation by the user, and modifying the control data for the virtual device in said second storage section and the control data in the audio device at once in response to the control operation.

2. The sound system as claimed in claim 1, wherein each of the virtual devices and the audio devices in the area belongs to one of a plurality of groups created in the area, the area information in said second storage section of said control device further includes group information indicative of the groups to which the virtual devices belongs, said first storage section of each of said plurality of audio devices further stores therein group information indicative of one of the groups to which the audio device belongs, said synchronization section further synchronizes the group information in the audio devices with the group information for the virtual devices in said second storage section, and said control device further comprises a group display section that displays icons of the virtual devices grouped into the groups in accordance with the group information in said second storage section.

3. The sound system as claimed in claim 2, wherein said matching section further receives the group information stored in said first storage section from each of said audio devices and judges, for each of the audio devices, if the audio device ID, the area ID, and the group information from the audio device matches any of the virtual device IDs and the group information corresponding to the virtual device IDs, and the area ID in said second storage section or not and, if the judgment is affirmative, relates the audio device with the virtual device identified by the matched virtual device ID and the area ID.

4. A sound system as claimed in claim 1, wherein at least one of said audio devices further includes a first setting section that sets the in-area ID in the audio device ID and the area ID, for storage in said first storage section, in response to a first setting operation by the user.

5. A sound system as claimed in claim 1, wherein said control device further comprises a registration section that newly registers a virtual device in the area in response to a registering operation by the user, one piece of virtual device information for the registered virtual device being stored in said second storage section.

6. A sound system as claimed in claim 1, wherein said control device further comprises a second setting section that sets at least one of the virtual device IDs, for storage in said second storage section, in response to a second setting operation by the user.

7. The sound system as claimed in claim 5, wherein said control device further comprises an automatic setting section that, when the virtual device is newly registered in the area, automatically sets the virtual device ID for the virtual device, for storage in said second storage section, in accordance with a predetermined rule.

8. A sound system as claimed in claim 1, wherein said virtual device ID for each of the virtual devices is composed of a unique ID and an in-area ID similarly to the audio device ID.

9. A sound system as claimed in claim 8, wherein said matching section relates the audio device with a virtual device if the unique ID received from the audio device matches the unique ID for the virtual device in said second storage section.

10. A sound system as claimed in claim 8, wherein said matching section relates the audio device with a virtual device if the in-area ID and the area ID received from the audio device match the in-area ID and the area ID for the virtual device in said second storage section.

11. A sound system including a network having connected thereto a plurality of audio devices and at least one control device for controlling the plurality of audio devices,
  each of said plurality of audio devices including a first storage section storing therein an audio device ID identifying the audio device, control data for controlling the audio device, and an area ID indicative of an area the audio device belongs to, the audio device ID being composed of an unique ID and an in-area ID, the in-area ID and area ID being set by a user,
  said control device comprising:
    a second storage section storing therein one piece of area information including an area ID indicative of an area and one or more pieces of virtual device information for one or more virtual devices registered in the area, each of the virtual device information including a virtual device ID identifying the corresponding virtual device, and control data for remotely controlling an audio device related to the corresponding virtual device;
    a matching section that receives, from each of the audio devices connected by the network, the audio device ID and the area ID in said first storage section in the audio device and thereby judges, for each of the audio devices, if the audio device ID and the area ID from the audio device match any of the virtual device IDs and the area ID in said second storage section or not and, if the judgement is affirmative, relates the audio device with the virtual device identified by the matched virtual device ID and the area ID;
    a synchronization section that synchronizes the control data for the virtual devices with the control data in the audio devices, by receiving, for each of the virtual devices, the control data from the audio device related with the virtual device and overwriting the control data for the virtual device in said second storage section with the received control data;
    an updating section that updates the control data for each of the virtual device if the control data for the virtual device in said second storage section is synchronized with the control data in any one audio device at the moment, said updating section receiving a change message from the one audio device when the control data in the one audio device is modified by the user and updating the control data for the virtual device in said second storage section based on the change message from the one audio device; and
    a display section that displays the control data for each of the virtual device in said second storage section such that the user can remotely monitor the control data in each of the audio devices.

12. A computer-implemented method for use in a sound system, including a network having connected thereto a plurality of audio devices and at least one control device for controlling the plurality of audio devices, for controlling and monitoring each of the audio devices by means of the control device,
  each of said plurality of audio devices including a first storage section storing therein an audio device ID identifying the audio device, control data for controlling the audio device, and an area ID indicative of an area the audio device belongs to, the audio device ID being composed of an unique ID and an in-area ID, the in-area ID and area ID being set by a user,
  said control device including a second storage section storing therein one piece of area information including an area ID indicative of an area and one or more pieces of virtual device information for one or more virtual devices registered in the area, each of the virtual device information including a virtual device ID identifying the corresponding virtual device, and control data for remotely controlling an audio device related to the corresponding virtual device;
  said method comprising:
    a matching step of receiving, from each of the audio devices connected via the network, the audio device ID and the area ID in said first storage section of the audio device and judging, for each of the audio devices, if the audio device ID and the area ID from the audio device match any of the virtual device IDs and the area ID in said second storage section or not and, if the judgment is affirmative, relates the audio device with the virtual device identified by the matched virtual device ID and the area ID;
    a step of synchronizing the control data for the virtual devices with the control data in the audio devices, by receiving, for each of the virtual devices, the control data from the audio device related with the virtual device and overwriting the control data for the virtual device in said second storage section with the received control data, or by transmitting, for each of the virtual device, the control data for the virtual device in said second storage section to the audio device related with the virtual device to overwrite the control data in the audio device with the transmitted control data; and
    a step of remotely controlling each of the audio device if the control data in the audio device is synchronized with the control data for one virtual device in said second storage section at the moment, by displaying the control data for the virtual device in said second storage section for the user, receiving a control operation by the user, and modifying the control data for the virtual device in said second storage section and the control data in the audio device at once in response to the control operation.

13. The computer-implemented method as claimed in claim 12, further comprising a step of setting the in-area ID in the audio device ID and the area ID, for storage in said first storage section, in response to a first setting operation by the user.

14. The computer-implemented method as claimed in claim 12, further comprising a registration step of newly registering a virtual device in the area in response to a registering operation by the user, one piece of virtual device information for the registered virtual device being stored in said second storage section.

15. The computer-implemented method as claimed in claim 12, further comprising a step of setting at least one of the virtual device IDs, for storage in said second storage section, in response to a second setting operation by the user.

16. A non-transitory computer-readable storage medium containing a group of instructions for causing a computer to perform a procedure for use in a sound system, including a network having connected thereto a plurality of audio devices and at least one control device for controlling the plurality of audio devices, for controlling and monitoring each of the audio devices by means of the control device, each of said plurality of audio devices including a first storage section storing therein an audio device ID identifying the audio device, control data for controlling the audio device, and an area ID indicative of an area the audio device belongs to, the audio device ID being composed of an unique ID and an in-area ID, the in-area ID and area ID being set by a user, said control device including a second storage section storing therein one piece of area information including an area ID indicative of an area and one or more pieces of virtual device information for one or more virtual devices registered in the area, each of the virtual device information including a virtual device ID identifying the corresponding virtual device, and control data for remotely controlling an audio device related to the corresponding virtual device;

said procedure comprising:

a matching step of receiving, from each of the audio devices connected via the network, the audio device ID and the area ID in said first storage section of the audio device and judging, for each of the audio devices, if the audio device ID and the area ID from the audio device match any of the virtual device IDs and the area ID in said second storage section or not and, if the judgment is affirmative, relates the audio device with the virtual device identified by the matched virtual device ID and the area ID;

a step of synchronizing the control data for the virtual devices with the control data in the audio devices, by receiving, for each of the virtual devices, the control data from the audio device related with the virtual device and overwriting the control data for the virtual device in said second storage section with the received control data, or by transmitting, for each of the virtual device, the control data for the virtual device in said second storage section to the audio device related with the virtual device to overwrite the control data in the audio device with the transmitted control data; and a step of remotely controlling each of the audio device if the control data in the audio device is synchronized with the control data for one virtual device in said second storage section at the moment, by displaying the control data for the virtual device in said second storage section for the user, receiving a control operation by the user, and modifying the control data for the virtual device in said second storage section and the control data in the audio device at once in response to the control operation.

17. A sound system including a network having connected thereto an audio device and a control device for controlling the audio device, said control device comprising:

a first storage section having one or more pieces of account information stored therein in correspondence with one or more users for identifying individual ones of the one or more users;

a first authentication section that permits any one of the users, corresponding to the one or more pieces of account information stored in said first storage section, to log in to said control device;

a control request section that transmits, to said audio device, the account information corresponding to the user, having logged in to said control device through permission by said first authentication section, and a control request asking for a permission to control said audio device by means of said control device; and a state setting section that receives, from said audio device, a response to the control request and, if the control request has been accepted via the response received, sets said control device in a state capable of controlling said audio device, said audio device comprising:

a second storage section having one or more pieces of account information stored therein in correspondence with one or more users for identifying individual ones of the one or more users;

a second authentication section that determines, on the basis of the control request and account information transmitted from said control request section of said control device, whether or not to authenticate the control request made by the logging-in user, wherein said second authentication section accepts the control request made by the logging-in user if the account information corresponding to the logging-in user matches any one of the pieces of account information stored in said second storage section, but rejects the control request made by the logging-in user if the account information corresponding to the logging-in user matches none of the pieces of account information stored in said second storage section; and a response section that transmits, to said control section, a result of authentication determination by said second authentication section.

18. A computer-implemented method for use in a sound system, including a network having connected thereto an audio device and a control device for controlling the audio device, for controlling and monitoring the audio device by means of the control device, said control device including a first storage section having one or more pieces of account information stored therein in correspondence with one or more users for identifying individual ones of the one or more users, said audio device including a second storage section having one or more pieces of account information stored therein in correspondence with the one or more users for identifying individual ones of the one or more users, said method comprising:

a step of said control device permitting any one of the users, corresponding to the one or more pieces of account information stored in said first storage section, to log in to said control device;

a step of said control device transmitting, to said audio device, the account information corresponding to the user, having logged in to said control device, and a control request asking for a permission to control said audio device by means of said control device; and a step of said control device receiving, from said audio device, a response to the control request and, if the control request has been accepted via the response received, setting said control device in a state capable of controlling said audio device, an authentication step of said audio device determining, on the basis of the transmitted control request and account information, whether or not to authenticate the control request made by the logging-in user, wherein said audio device accepts the control request made by the logging-in user if the account information corresponding to the logging-in user matches any one of the pieces of account information stored in said second storage section, but rejects the control request made by the logging-in user if the account information corresponding to the logging-in user matches none of the pieces of account information stored in said second storage section; and a step of said audio device transmitting, to said control section, a result of authentication determination by said authentication step.

19. A sound system including a network having connected thereto a plurality of audio devices and at least one control device for controlling the plurality of audio devices, said control device comprising:
  a display device;
  a first storage section having stored therein, in correspondence with the plurality of audio devices, a plurality of pieces of virtual device information including control data for controlling the audio devices and group information indicative of groups the plurality of pieces of virtual device information belong to; and
  a display control section that performs control for, on the basis of the group information stored in said first storage section, displaying, on the display device, the plurality of pieces of virtual device information separately for each of the groups the pieces of virtual device information belong to,
each of said plurality of audio devices including a second storage section having stored therein an audio device ID identifying the audio device, group information indicative of a group a corresponding one of the pieces of virtual device information belongs to, and control data for controlling behavior of the audio device,
said control device further comprising:
  an association section that receives, from each of said plurality of audio devices, the audio device ID stored in said second storage section and thereby performs association between the pieces of virtual device information and the audio devices on the basis of the received audio device IDs and virtual device IDs stored in said first storage section;
  a first synchronization control section that, when a particular one of the audio devices having been successfully associated with any one of the pieces of virtual device information is to be set as an object of remote control, writes the group information of the piece of virtual device information, stored in said first storage section in correspondence with the particular audio device, into said second storage section of the particular audio device corresponding to the one piece of virtual device information;
  a remote control section that, for the particular audio device set as the object of remote control by said first synchronization control section, changes the control data of the one piece of virtual device information stored in said first storage section and thereby changes, through remote control, the corresponding control data stored in said second storage section;
  a second synchronization control section that, when a particular one of the audio devices having been successfully associated with one of the pieces of virtual device information is to be set as an object of monitoring, receives the group information stored in said second storage section of the particular audio device to be set as the object of monitoring and updates the corresponding group information, stored in said first storage section, on the basis of the received group information, to thereby perform control to cause said display control section to update a grouping state, on the display device, of the pieces of virtual device information; and
  a monitoring control section that, when the control data stored in said second storage section has been changed in the particular audio device having been set as the object of monitoring by said second synchronization control section, changes the control data of the virtual device information, stored in said first storage section in correspondence with the audio device set as the object of monitoring, similarly to the changed control data in said second storage section.

20. A computer-implemented method for use in a sound system, including a network having connected thereto a plurality of audio devices and at least one control device for controlling the plurality of audio devices, for controlling and monitoring each of the audio devices by means of the control device, said control device including a display device, and a first storage section having stored therein, in correspondence with the plurality of audio devices, a plurality of pieces of virtual device information including control data for controlling the audio devices and group information indicative of groups the plurality of pieces of virtual device information belong to
each of said plurality of audio devices including a second storage section having stored therein an audio device ID identifying the audio device, group information indicative of a group a corresponding one of the pieces of virtual device information belongs to, and control data for controlling behavior of the audio device,
said method comprising:
  a step of performing control for, on the basis of the group information stored in said first storage section, displaying, on the display device, the plurality of pieces of virtual device information separately for each of the groups the pieces of virtual device information belong to,
  an association step of receiving, from each of said plurality of audio devices, the audio device ID stored in said second storage section and thereby performing association between the pieces of virtual device information and the audio devices on the basis of the received audio device IDs and virtual device IDs stored in said first storage section;
  a step of, when a particular one of the audio devices having been successfully associated with any one of the pieces of virtual device information is to be set as an object of remote control, writing the group information of the piece of virtual device information, stored in said first storage section in correspondence with the particular audio device, into said second storage section of the particular audio device corresponding to the one piece of virtual device information;
  a step of, when a particular one of the audio devices having been successfully associated with one of the pieces of virtual device information is to be set as an object of monitoring, receiving the group information stored in said second storage section of the particular audio device to be set as the object of monitoring and updates the corresponding group information, stored in said first storage section, on the basis of the received group information, to thereby perform control for updating a grouping state, on the display device, of the pieces of virtual device information; and a step of, when the control data stored in said second storage section has been changed in the particular audio device having been set as the object of monitoring, changing the control data of the virtual device information, stored in said first storage section in correspondence with the audio device set as the object of monitoring, similarly to the changed control data in said second storage section.

* * * * *